US012785572B2

(12) United States Patent
Bianco et al.

(10) Patent No.: US 12,785,572 B2
(45) Date of Patent: Nov. 3, 2026

(54) MULTIMODE RESONANT CIRCUIT AND CORRESPONDING METHOD

(71) Applicant: STMicroelectronics International N.V., Geneva (CH)

(72) Inventors: Alberto Bianco, Gressan (IT); Francesco Ciappa, Borgofranco D'ivrea (IT); Riccardo Peloso, Aosta (IT); Giuseppe Scappatura, Aymavilles (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 82 days.

(21) Appl. No.: 19/020,105

(22) Filed: Jan. 14, 2025

(65) Prior Publication Data

US 2025/0247007 A1 Jul. 31, 2025

(30) Foreign Application Priority Data

Jan. 26, 2024 (IT) ........................ 102024000001530

(51) Int. Cl.
*H02M 3/335* (2006.01)
*H02M 3/00* (2006.01)

(52) U.S. Cl.
CPC ........... *H02M 3/3353* (2013.01); *H02M 3/01* (2021.05)

(58) Field of Classification Search
CPC .... H02M 3/3353; H02M 3/01; H02M 1/0058; H02M 3/33571
See application file for complete search history.

(56) References Cited

U.S. PATENT DOCUMENTS 6,154,375 A * 11/2000 Majid ................. H02M 3/3376 363/16
6,504,267 B1 1/2003 Giannopoulos
(Continued)

FOREIGN PATENT DOCUMENTS

CN 110661427 A 1/2020
CN 112130049 A 12/2020
(Continued)

OTHER PUBLICATIONS

STMicroelectronics, "Search Report and Written Opinion", Italian Patent Application No. 202400001530, dated Jul. 23, 2024, 9 pages.

*Primary Examiner* — Kyle J Moody
(74) *Attorney, Agent, or Firm* — Slater Matsil, LLP

(57) ABSTRACT

A circuit, including first and second electronic switches cascaded in a current flow line between an input node and ground, a transformer having a primary winding coupled across the second electronic switch, and a capacitor coupled across the secondary winding, is operated by making the first and second electronic switches conductive and non-conductive in a sequence of phases including an energy storage phase, with current flow in the primary winding and no current flow in the secondary winding, and subsequently a concurrent conduction phase, with current flow in both the primary and secondary windings of the transformer. The circuit is operable in a first mode, wherein the concurrent conduction phase is maintained over a first off time of the first switch, and in a second mode, wherein the concurrent conduction phase is maintained over a second off time of the first switch shorter than the first off time.

20 Claims, 14 Drawing Sheets

(56) References Cited

U.S. PATENT DOCUMENTS

| | | | | |
|---|---|---|---|---|
| 10,355,613 | B2 * | 7/2019 | Oki | H02M 3/3378 |
| 2004/0032754 | A1 | 2/2004 | Yang | |
| 2015/0229226 | A1 * | 8/2015 | Lee | H02M 3/33592<br>363/21.02 |
| 2016/0111964 | A1 | 4/2016 | Oki et al. | |
| 2017/0331386 | A1 | 11/2017 | Babazadeh | |
| 2018/0367042 | A1 | 12/2018 | Anderson et al. | |
| 2023/0080559 | A1 | 3/2023 | Song et al. | |

FOREIGN PATENT DOCUMENTS

| | | | |
|---|---|---|---|
| CN | 115833601 | A | 3/2023 |
| CN | 116073639 | A1 | 5/2023 |
| CN | 113765407 | B | 8/2023 |
| EP | 2081288 | A1 | 7/2009 |

* cited by examiner

MULTIMODE RESONANT CIRCUIT AND CORRESPONDING METHOD

CROSS-REFERENCE TO RELATED APPLICATIONS

This application claims the benefit of Italian Patent Application No. 102024000001530, filed on Jan. 26, 2024, which application is hereby incorporated herein by reference.

TECHNICAL FIELD

The description relates to resonant flyback circuits.

BACKGROUND

Aspects of the present description can be used in applications using an AC-DC converter, for instance.

Personal computers, mobile phones, various types of power supplies and such as extended power range (EPR) chargers are exemplary of such possible applications.

The designation resonant flyback topology applies to a switching converter topology that is gaining attention thanks to its flexibility in terms of output voltage regulation, high efficiency and low voltage stress on both primary and secondary side components.

That topology is indicated in the literature with various other names, such as "half bridge flyback", "hybrid flyback", "asymmetric half bridge" (this last designation is sometimes used also for different topologies, which may lead to some confusion).

The topology of such a circuit, designated 10 as a whole, is illustrated in FIG. 1 for immediate reference.

As illustrated (in a deliberately simplified manner for ease of understanding), the circuit 10 comprises a high-side switch QH and a low-side switch QL such as MOSFET transistors, for instance) having the current paths therethrough (source-drain in the case of field-effect transistors such as MOSFETs) cascaded in a current flow line between a supply node/line VIN (from a signal source not visible in the figures for simplicity) and a ground node/line PRI_GND.

As illustrated, a transformer Tx is provided arranged with:

- a primary winding coupled between a node N located intermediate the electronic switches QH, QL and one terminal of a resonance capacitor CRES, having the other terminal connected to PRI_GND; and
- a secondary winding coupled between a first terminal of a capacitor C and (the cathode of) a diode D, with the diode coupled (at the anode) to the other terminal of the capacitor C.

The voltage across the capacitor C can be regarded as the output voltage Vout of the circuit 10 (this is intended to be applied to a load not visible in the figures for simplicity).

The electronic switches (MOSFET transistors QH, and QL) can be selectively turned "on" (that is, made conductive) and "off" (that is made non-conductive) via control signals applied—in a manner known per se to those of skill in the art—to the control electrodes thereof (gates, in the case of field-effect transistors such as MOSFETs), labelled HSGD and LSGD via controller circuitry not visible in Figures other than FIGS. 15 and 20.

These figures will be discussed in the detailed description of the embodiments.

The diagrams of FIGS. 2B, 3B, 4B, 5B, 6B, and 7B are exemplary of possible time behaviors—plotted against a common abscissa time scale—of (from top to bottom):

- the current Isec in the secondary winding of the transformer Tx;
- the current Ipri in the primary winding of the transformer Tx; and
- the voltage Vlsd on the drain of the low-side switch QL, namely the voltage at the node N.

Operation of a converter 10 as illustrated in FIG. 1 operates on two main phases: an "on" phase and an "off" phase.

During the "on" phase, the high-side switch QH is turned on (made conductive) and energy is stored both in the magnetizing inductance of the transformer Tx and in the associated resonance capacitor CRES in series to the primary winding of the transformer Tx.

During the "off" phase, the high-side switch QH is turned off (made non-conductive) and the low-side switch QL is turned on (made conductive); the energy previously stored in the capacitance CRES and in the magnetizing inductance of the transformer Tx is transferred to the secondary side (across the capacitor C) through the transformer Tx and the diode D.

It is noted that the structure of the primary side of the circuit 10 is symmetrical: changing the polarity of the transformer windings, the switch QL (here referred to as low-side) can be used as switch for the "on" phase and the switch QH (here referred to as high-side) can be used as switch for the "off" phase.

The choice between the two configurations depends on design choices that are of no specific import for the embodiments. The first solution (the switch QH used for the "on" phase) will be referred to throughout this description for simplicity.

More in detail, operation of a converter circuit 10 as illustrate in FIG. 1 can be regarded as involving five (sub) phases labelled I, II, III, IV, and V as represented:

- in FIGS. 2A and 2B (phase I);
- in FIGS. 3A and 3B (phase II);
- in FIGS. 4A and 4B (phase III);
- in FIGS. 5A and 5B (phase IV); and
- in FIGS. 6A and 6B (phase V), respectively.

In an energy storage phase (labelled I in FIG. 2B) as represented in FIGS. 2A and 2B, the high-side switch QH is turned on (made conductive) with the low-side switch QL non-conductive. Current in the primary side of the transformer Tx increases almost linearly—in so far as the "on" time can be assumed to be (much) shorter than the resonance period produced between the resonant capacitor CRES and the inductance of the primary side of the transformer Tx. Practically no current flows on the secondary side of the transformer Tx.

FIGS. 3A and 3B are exemplary of a (first) dead time (labelled II in FIG. 3B) during which both the high-side switch QH and the low-side switch QL are off (non-conductive), and current flowing in the primary side of the transformer Tx discharges the parasitic capacitances CPAR associated with the switching node N, forcing it to drop down to 0V.

FIGS. 4A and 4B are exemplary of a secondary side conduction phase (labelled III in FIG. 4B), during which the low-side switch QL is turned on (made conductive) with high-side switch QH non-conductive. Current flows both on the primary side and on the secondary side of the transformer Tx generating a "bump" which is due to the resonance between the leakage inductance of the transformer Tx and the clamp capacitor C.

This phase terminates when the current on the secondary side of the transformer Tx reaches a zero value or can be truncated earlier if QL is turned off (made nonconductive) prematurely.

The duration $T_{cond}$ of this phase (labelled III) is almost constant since it is determined by the resonant period of the leakage inductance Lk of the transformer Tx with the capacitance of the resonance capacitor CRES and approximately equal to:

$$T_{cond} \approx \pi/\sqrt{(Lk *_{CRES})}$$

FIGS. 5A and 5B are exemplary of an extra "off" time (labelled IV in FIG. 5B) during which the low-side switch QL is kept on (conductive) while current no longer flows on the secondary side of the transformer Tx.

During this phase the current in the primary side of the transformer Tx is essentially equal to the magnetization current. The purpose of this phase is to load energy in the magnetizing inductance of the transformer Tx in order to obtain a soft switching in the following phase.

From the viewpoint of a controller on the primary side of the transformer Tx, the extra "off" time phase IV is just a continuation of the previous one, since the switches are controlled in the same way (high-side switch QH off; low-side switch QL on).

FIGS. 6A and 6B are exemplary of a second dead time phase (labelled V in FIG. 6B) during which the low-side switch QL is turned off (non-conductive) and current flowing in the magnetizing inductance of the transformer Tx charges parasitic capacitances associated with the switching node N, raising it up to the input voltage VIN.

The converter circuit 10 then can then restart the cycle from phase I with the high-side switch QH turned on (made conductive).

The "concurrent conduction" phase III and the phase IV can be considered as representative of the "off" phase mentioned at the outset, namely the phase during which the primary side switch QH is off.

The dead times II and V have a very short duration, practically negligible in comparison with the other phases and will not be specifically considered in the rest of this description.

Determining the duration of the "off" phase may turn out to be difficult for various reasons.

An optimal duration of the "off" phase is the one which results in the magnetizing inductance of the transformer Tx having loaded therein energy that is just enough to force a soft switching at the time the low-side switch QL is turned off.

Reaching that target is difficult for at least two reasons.

In the first place, during all the secondary side conduction phase, the current "seen" from the primary side of the transformer Tx is the sum of the current flowing to the secondary side on the transformer Tx, reflected on the primary side, and the current flowing in the magnetizing inductance of the transformer Tx. Thus, determining the current flowing in the magnetizing inductance is hardly feasible. Detecting, from the primary side of the transformer Tx, when the secondary side conduction phase terminates is likewise complex.

Additionally, the amount of energy absorbed in the magnetizing inductance of the transformer Tx to obtain soft switching depends on the parasitic capacitances of both switches QH and QL: these are non-linear, affected by a good degree of uncertainty.

Also, during the "off" time, the voltage across the magnetizing inductance of the transformer Tx is equal to the output voltage multiplied by the turns ratio n of the transformer Tx. The slope at which the magnetizing current iM drops as a function of time during this phase can be expressed as:

$$(\partial iM)/\partial t = (nVout)/Lm$$

where Lm denotes the magnetizing inductance of the transformer Tx.

The time required by the magnetizing current iM to reach zero starting from an initial value is inversely proportional to the output voltage.

A resonant flyback topology as discussed herein is suited for power supplies such as USB power delivery (USB-PD) power supplies, which can have widely varying output voltages. For example, it is desirable that various power supplies may generate an output voltage varying from 5V to 48V as a function of commands received from a load connected to the power supply. In that case, the "off" time can vary in a ratio of 10:1 for a same peak current.

For instance, FIGS. 7A and 7B show possible waveforms (again for the currents Isec and Ipri and the voltage VIsd) for high and low output voltages for a similar output current In the first case (low voltage—FIG. 7A), the magnetizing current drops rapidly and a new cycle can restart shortly after conduction on the secondary side of the transformer Tx has terminated.

In the second case (high voltage—FIG. 7B), the current in the magnetizing inductance drops (very) slowly and, in order to achieve a soft switching, the low-side switch QL remains on (conductive) for a long time after conduction on the secondary side of the transformer Tx has terminated. This leads to a marked drop in conversion efficiency in so far as all the current is delivered to the secondary side of the transformer for a short period of time with a very high peak current, which results in a high RMS current on both the primary side and the secondary side of the transformer Tx.

Document CN113765407B discloses a self-adaptive soft switching control system of a primary side feedback active clamping flyback converter. The system comprises a main topology circuit and a closed-loop control loop; an auxiliary winding is additionally arranged on the secondary side of a transformer, voltage sampling is carried out on the two ends of the auxiliary winding through two divider resistors, and feedback voltage of winding voltage is input into a closed-loop control loop; a current sampling resistor is added between a main switching tube and a ground end, and the voltage of the sampling resistor is input to a closed-loop control loop; the closed-loop control loop comprises a primary side current detection module, an auxiliary winding detection module, a dead time calculation module and a PWM driving module; the dead time calculation module calculates the dead time of the control signals of the main switch tube and the auxiliary switch tube according to the time signals and the current signals received by the input end; and the system is connected with a controlled switching power supply to form a closed loop. Zero voltage switching, ZVS is achieved, switching loss is reduced, and therefore the efficiency of the whole system is improved.

Document CN115833601A discloses a soft switching control circuit applied to an isolation power supply system. The secondary soft switching control circuit comprises a secondary controller, a synchronous rectifier tube and an output capacitor; the secondary side controller comprises a power supply system energy transmission module, a matching module and a synchronous rectification and zero voltage switch module which are connected in sequence; according to the soft switching control circuit provided by the disclosure, the power system energy can be detected through the power system energy transmission module, and then the power system energy is utilized to predict the turn-"on" time of the primary controller in the current period in advance in a self-adaptive energy matching mode.

Other documents of interest include US 2004/032754 A1, EP 2081288 A1, U.S. Pat. No. 6,504,267 B1, US 2023/080559 A1, and CN 116073639 A.

SUMMARY

An object of one or more embodiments is to contribute in addressing the various issues discussed in the foregoing.

According to one or more embodiments, such an object can be achieved by a circuit having the features set forth in the claims that follow.

One or more embodiments relate to a corresponding device (any device using a converter circuit as discussed may be exemplary of such a device).

One or more embodiments relate to a corresponding method.

The claims are an integral part of the technical teaching provided herein in respect of the embodiments.

In solutions as described herein, efficiency is increased, especially when operating at low output voltage, via a non-complementary control mode adopted for switch operation when "off" time exceeds a threshold.

In solutions as described herein, improvements in conversion efficiency for a resonant flyback converter which can operate at a variable output voltage can be achieved in response to changing the switch control sequence based on the duration of the "off" time, using a non-complementary control when the "off" time exceeds, twice the duration of the resonant "bump", for instance.

BRIEF DESCRIPTION OF THE DRAWINGS

One or more embodiments will now be described, by way of example only, with reference to the annexed figures, wherein.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 2A:
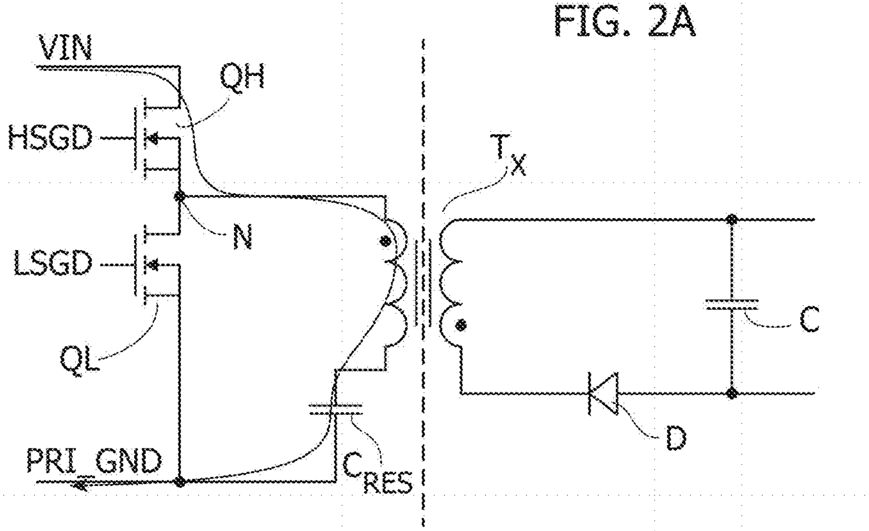
Figure 2B:
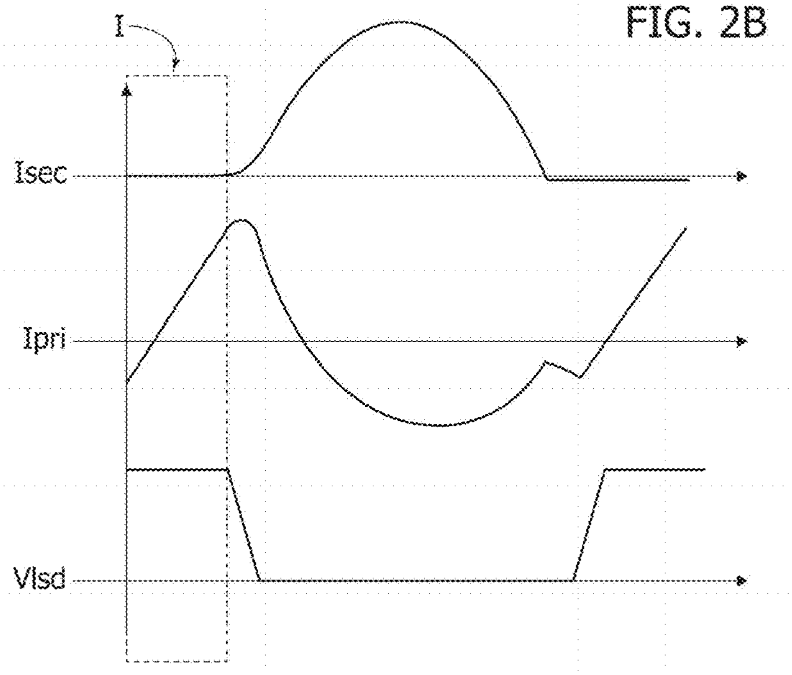
Figure 3A:
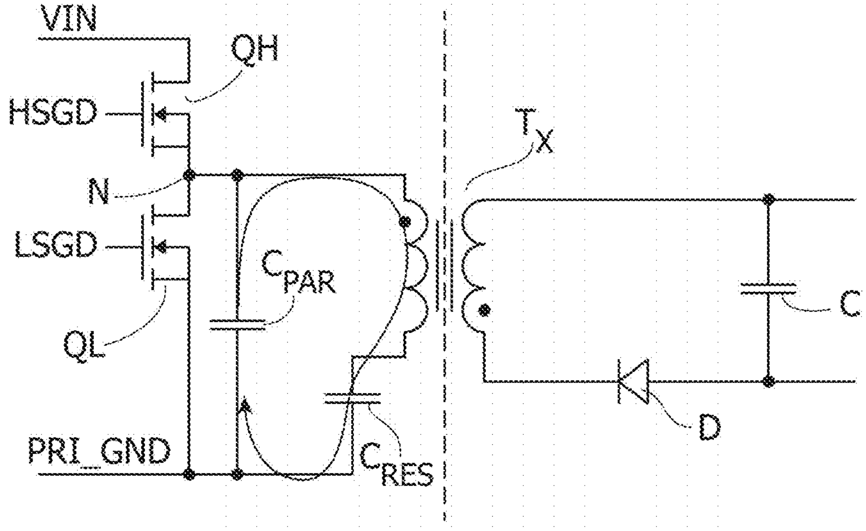
Figure 3B:
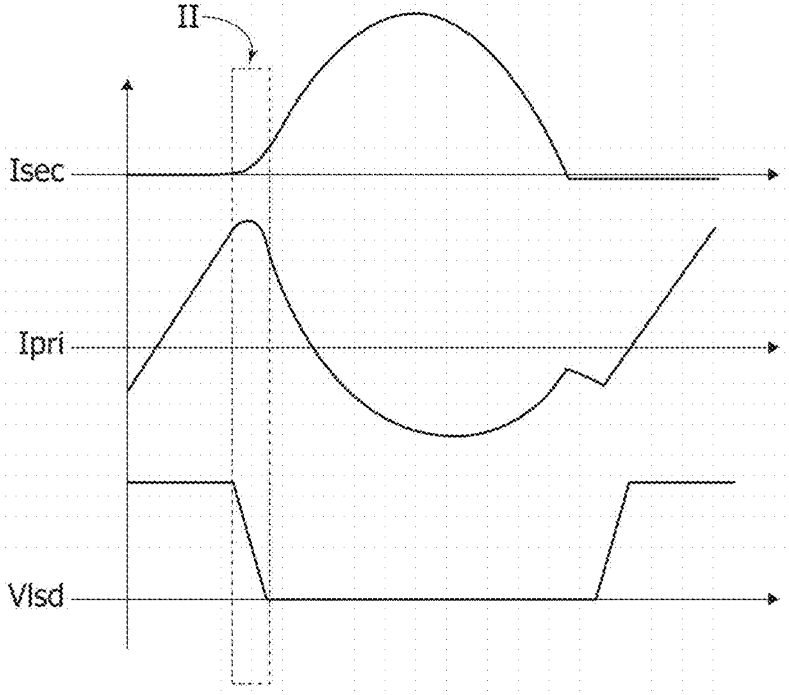
Figure 11A:
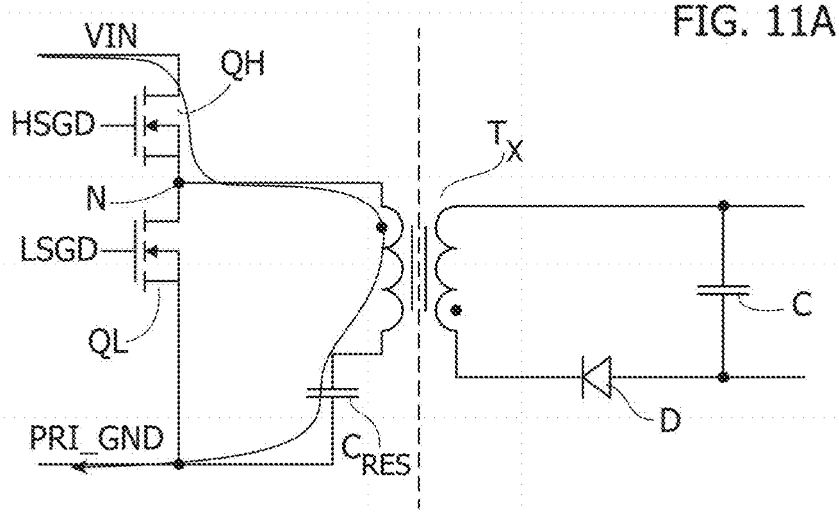
FIGS. 11A, 11B; 12A, 12B; 13A, 13B; and 14A, 14B are illustrative of subsequent phases in a control sequence according to solutions described in the present description.
Figure 11B:
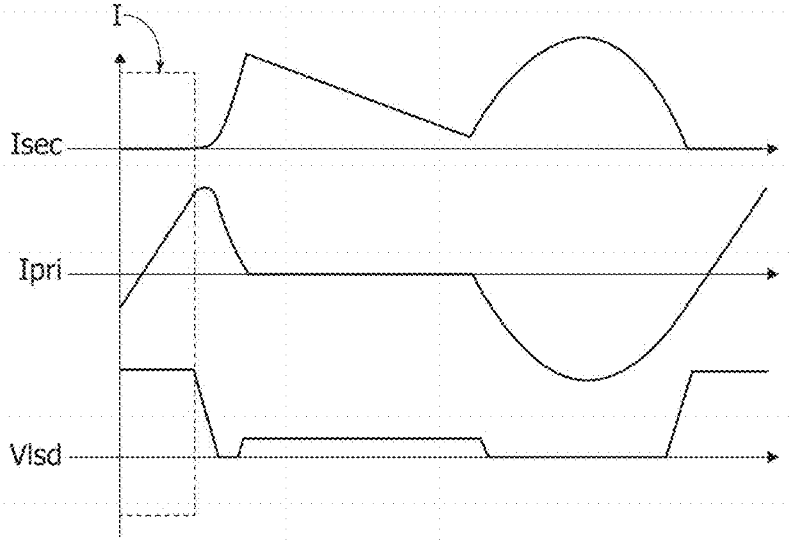
Figure 12A:
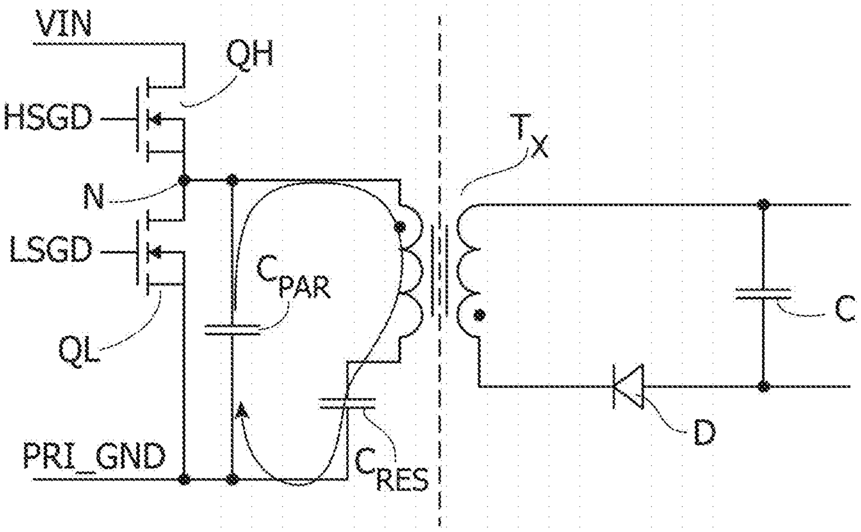
Figure 12B:
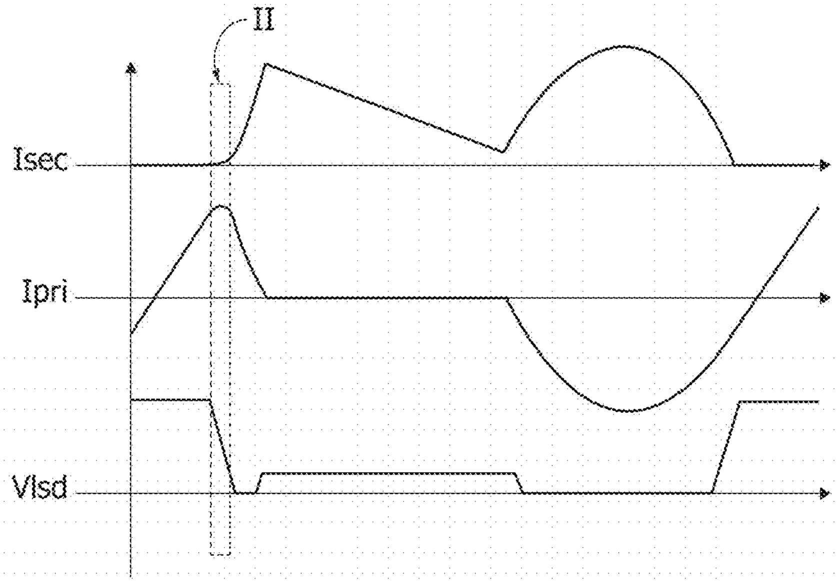

In that respect it is noted that FIGS. 11A and 11B; FIGS. 12A and 12B; and FIGS. 14A and 14B essentially correspond to FIGS. 2A and 2B; FIGS. 3A and 3B; and FIGS. 4A and 4B, as discussed previously, respectively.

Figure 13A:
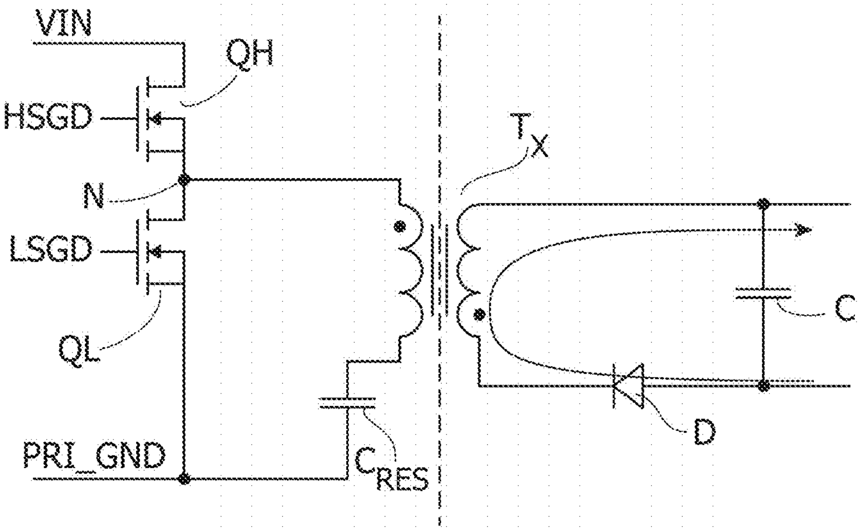
Figure 13B:
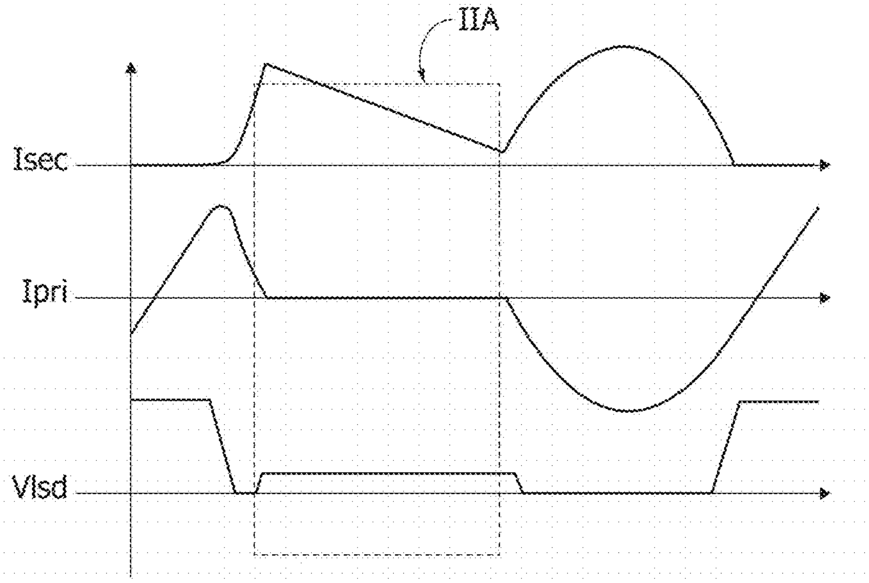

This repetition of figures is essentially intended to facilitate understanding operation of the circuit 10 during the phase labelled IIA represented in FIGS. 13A and 13B.

Once more, for the sake of simplicity and ease of explanation, a same designation may be applied throughout this description to designate:

- a certain node or line as well as a signal occurring at that node or line (the signal/node VIN in the figures is exemplary of this), and/or
- a certain component (such as a capacitor, resistor or inductor of coil) as well as electrical parameter thereof.

Figures from FIG. 8 onwards again illustrate, in a deliberately simplified manner for ease of understanding, a circuit 10 comprising a high-side switch QH and a low-side switch QL such as MOSFET transistors, for instance) having the current paths therethrough (source-drain in the case of field-effect transistors such as MOSFETs) cascaded in a current flow line between a supply node/line VIN (from a signal source not visible in the figures for simplicity) and a ground node/line PRI_GND.

As illustrated, a transformer Tx is provided arranged with:

a primary winding coupled between a node N located intermediate the electronic switches QH, QL and a terminal of a resonance capacitor CRES having the other terminal connected to ground PRI_GND; and a secondary winding coupled between a first terminal of a capacitor C and (the cathode of) a diode D, with the diode coupled (at the anode) to the other terminal of the capacitor C.

The voltage across the capacitor C can be regarded as the output voltage Vout of the circuit 10 (this is intended to be applied to a load not visible in the figures for simplicity).

The electronic switches (MOSFET transistors QH, and QL) can be selectively turned "on" (that is, made conductive) and "off" (that is, made non-conductive) via control signals applied—in a manner known per se to those of skill in the art—to the control electrodes thereof (gates, in the case of field-effect transistors such as MOSFETs), labelled HSGD and LSGD via controller circuitry illustrated in FIGS. 15 and 20 to be discussed in detail in the following.

It is again noted that the structure of the primary side of the circuit 10 is symmetrical: changing the polarity of the transformer windings, the switch QL (here referred to as low-side) can be used as switch for the "on" phase and the switch QH (here referred to as high-side) can be used as switch for the "off" phase.

Figure 1:
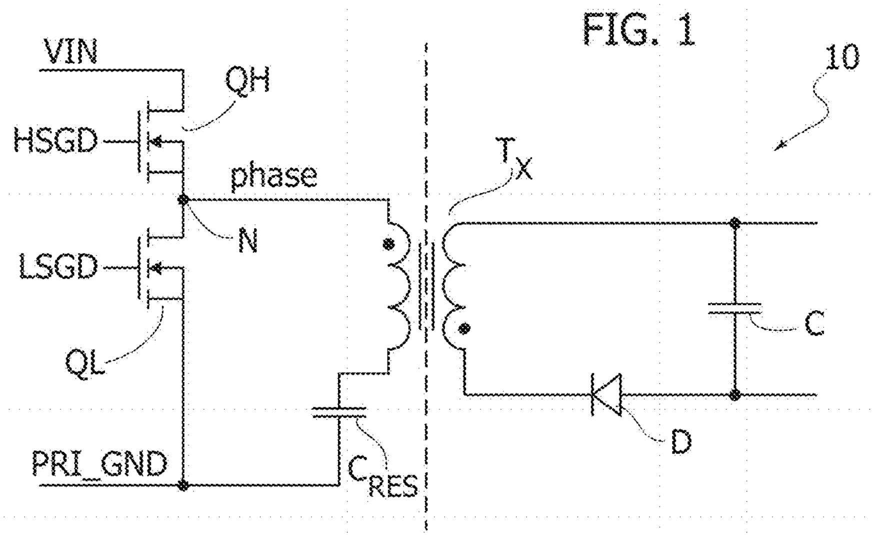
FIGS. 1; 2A, 2B; 3A, 3B; 4A, 4B; 5A, 5B; 6A, 6B; and 7A, 7B illustrate a circuit and its operation.
Figure 8:
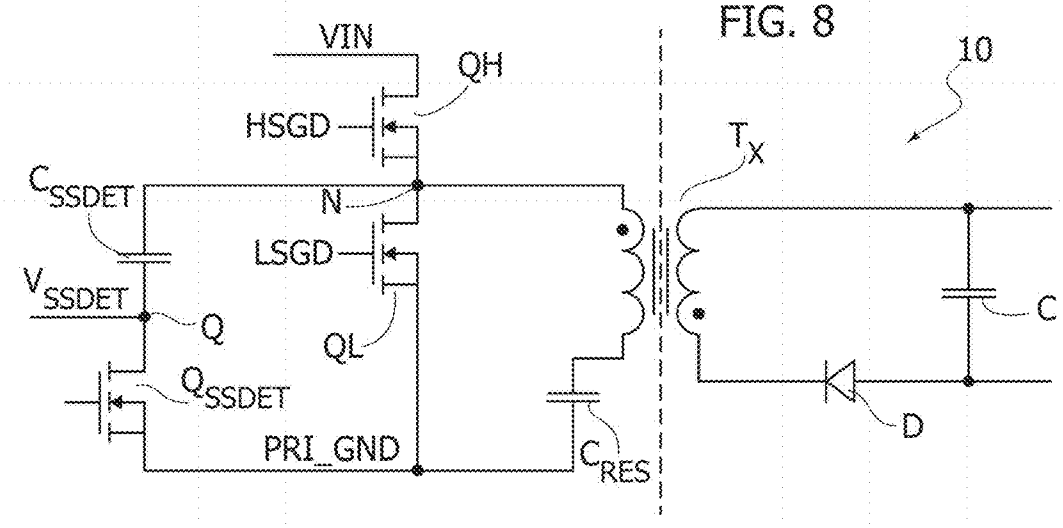
FIG. 8 is a circuit diagram exemplary of a possible implementation of solutions described in the present description.

In FIG. 8, like in FIG. 1, the circuit 10 thus comprises:

a first electronic switch (the high-side switch QH in the exemplary case considered herein) and a second electronic switch (the low-side switch QL in the exemplary case considered herein) having current flow paths therethrough (source-drain the exemplary case of field-effect transistors like MOSFET transistors as considered herein) cascaded—with the node N intermediate therebetween—in a current flow line between an input node VIN and a (primary side) ground PRI_GND, a transformer Tx having a primary winding coupled across the second electronic switch (here QL-via the resonance capacitor CRES); and a capacitor C coupled across the secondary winding of the transformer Tx wherein an output voltage from the circuit 10 is available across the capacitor C.

When it is mentioned herein that an element is "connected to" or "coupled to" another element, it should be understood that still another element may be interposed therebetween. This is the case, for instance, of the resonance capacitor CRES, through which the primary winding of the transformer Tx is coupled across the second electronic switch QL, with the primary winding coupled between the node N located intermediate the electronic switches QH, QL and a terminal of a resonance capacitor CRES having the other terminal connected to ground PRI_GND.

On the contrary, when possibly mentioned that an element is "connected directly to" or "coupled directly to" another element, it should be understood that still another element is not interposed therebetween.

Again, the exemplary circuit 10 of FIG. 8 comprises the series connection of the capacitor C and a diode D coupled across the secondary winding of the transformer Tx, with the capacitor C coupled between the node N and the (anode of the) diode D.

The exemplary circuit illustrated in FIG. 8 comprises drive circuitry (such as the elements 106; HFF, LFF, 212H, 212L discussed in the following) configured to make the first electronic switch QH and the second electronic switch QL conductive and non-conductive in a sequence of phases comprising:

an energy storage phase (labelled I), wherein the first electronic switch QH is conductive and the second electronic switch QL non-conductive with current flow facilitated (allowed) in the primary winding of the transformer Tx and countered (essentially prevented) in the secondary winding of the transformer Tx a (subsequent in the sequence) phase labelled III wherein the first electronic switch QH is non-conductive and the second electronic switch QL conductive with a sort of "concurrent conduction" resulting from current flow facilitated in both the primary winding of the transformer Tx and in the secondary winding of the transformer Tx.

As already discussed, referring to the sequence of phases of operation of the circuit 10 as comprising an energy storage phase (labelled I) and a subsequent concurrent conduction phase (labelled III) does not imply that the sequence consists only of those phases or that the concurrent conduction phase follows immediately the energy storage phase.

Indeed, the exemplary sequence of phases of operation of the circuit 10 as already discussed, also comprises other phases, such as those labelled II, IV, and V with the phase (dead time) II possibly extended by a secondary side conduction time as exemplified by IIA in the following between the phases 1 and II.

In comparison with the circuit 10 of FIG. 1, the exemplary circuit 10 of FIG. 8 comprises, arranged in a current flow line between the node N and the ground line or node PRI_GND, the series connection of:

a further electronic switch $Q_{SSDET}$ (again a MOSFET transistor, for instance) having a current path therethrough (source-drain in the case of field-effect transistors such as MOSFETs); and a further capacitor $C_{SSDET}$ arranged between the node N and the switch $Q_{SSDET}$ with a voltage $V_{SSDET}$ occurring at node Q, wherein the switch $Q_{SSDET}$ is arranged between the node Q and the ground line or node PRI_GND.

Figure 9A:
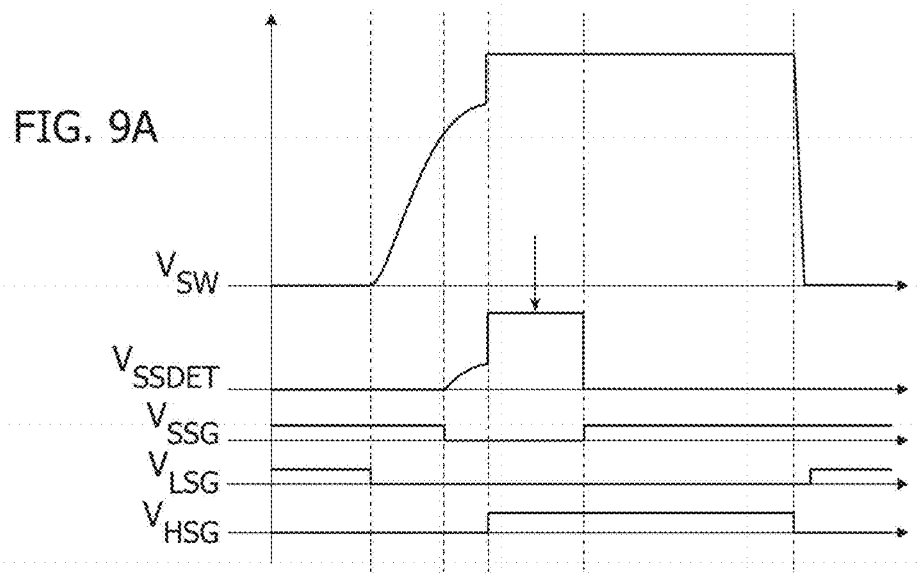
FIGS. 9A, 9B, and 9C and FIG. 10 are time diagrams explicative of principles underlying solutions described in the present description.
Figure 9B:
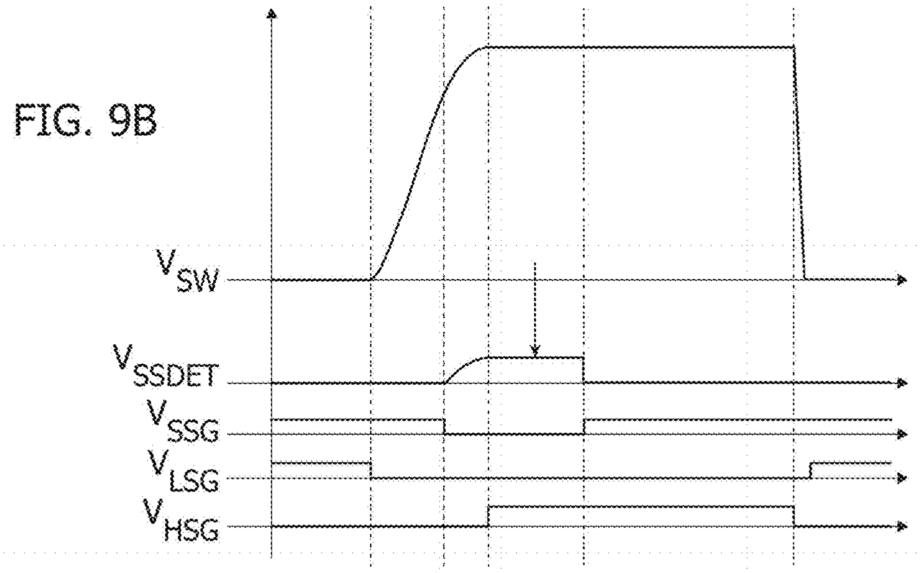
Figure 9C:
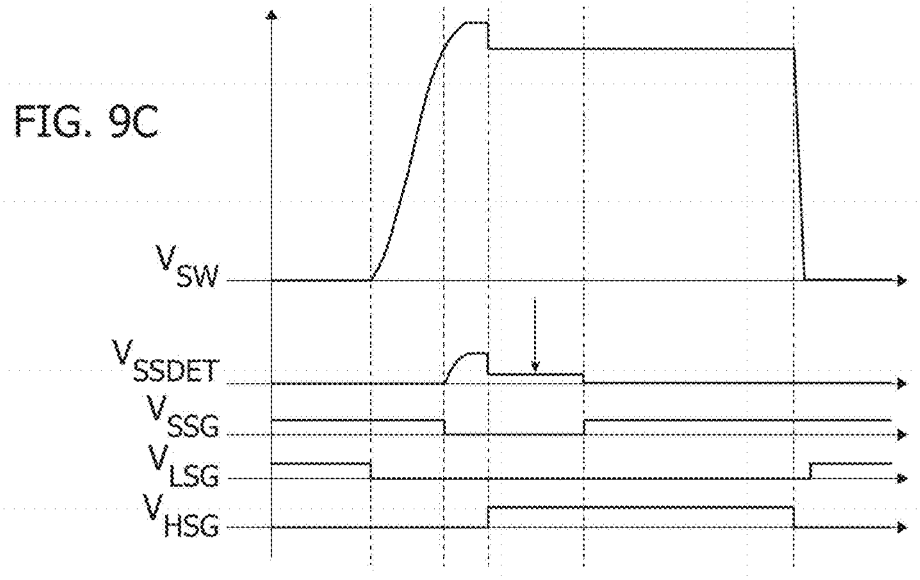

The diagrams of FIGS. 9A, 9B, and 9C are exemplary of possible time behaviors-plotted against a common time abscissa scale—of (from top to bottom):

the voltage $V_{SW}$ at the switching node N;

the voltage $V_{SSDET}$;

the drive voltage $V_{SSG}$ applied to the control terminal of the switch $Q_{SSDET}$;

a drive voltage $V_{LSG}$ applied to the control terminal LSGD (gate in the case of field-effect transistor such as a MOSFET transistor) of the low-side switch QL; and a drive voltage $V_{HSG}$ applied to the control terminal HSGD (gate in the case of field-effect transistor such as a MOSFET transistor) of the high-side switch QH.

The solutions proposed herein adopt an adaptive control of the "off" time Toff, wherein such an "off" time is determined via an adaptive algorithm which adapts the duration based on a soft switching detector as represented on the left-hand side of FIG. 8.

Advantageously, a small value (around 10 pF) is selected for the capacitor $C_{SSDET}$ associated with the switch $Q_{SSDET}$ so that the voltage $V_{SSDET}$ on the node Q between the capacitor $C_{SSDET}$ and the switch $Q_{SSDET}$ can be measured to determine if the system operates in soft switching.

The switch $Q_{SSDET}$ is kept on (conductive) most of the time and is turned off (made non-conductive) during the dead time between the turn "off" time of the low-side switch QL and the turn "on" time of the high-side switch QH. After the high-side switch QH is turned on, the voltage $V_{SSDET}$ is measured, and the switch $Q_{SSDET}$ is turned on again.

When the switch $Q_{SSDET}$ is on, the voltage $V_{SSDET}$ at the node Q is forced to 0, while when the switch $Q_{SSDET}$ is off it tracks the voltage on the switching node N, so it can be used to measure the voltage transitions during the deadtime.

FIGS. 9A, 9B and 9C show possible waveforms during the dead time between the turn-off time of the low-side switch QL and the turn-on time of the high-side switch QH (briefly, "the QL-to-QH" dead time) for different conditions.

FIG. 9A refers to a case where the energy in the magnetizing inductance at the end of the "off" time is too low to obtain soft switching. When the gate of the low-side switch QL (the voltage $V_{LSG}$ in the graph) is turned off, the voltage $V_{SW}$ at the switching node N starts to rise. When the gate of the high-side switch QH gate (the voltage $V_{HSG}$ in the graph) is turned on, the voltage $V_{SW}$ at the switching node is still lower than the converter input voltage VIN, so it abruptly rises to the input voltage.

FIG. 9B refers to a case where an optimal soft switching occurs: the energy in the magnetizing inductance when the low-side switch QL is turned off is just enough to cause the voltage $V_{SW}$ at the switching node N to reach the input voltage VIN just before the high-side switch QH is turned on.

FIG. 9C refers to a case where an excessive amount of energy is stored in the magnetizing inductance, so that the voltage $V_{SW}$ at the switching node N bypasses the input voltage during the dead time that leads to the body diode of the high-side switch QH being turned on (becoming conductive).

From the instant when the switch $Q_{SSDET}$ is turned off, the voltage $V_{SSDET}$ tracks the voltage $V_{SW}$ at the switching node N with a constant difference. If the voltage $V_{SSDET}$ is measured at a time after the high-side switch QH is turned on, the difference between the voltage $V_{SSDET}$ at the time the switch $Q_{SSDET}$ is turned off and the input voltage can be measured.

The timing between turning off the switch $Q_{SSDET}$ and turning on the high-side switch QH is an arbitrary parameter that can be defined in the design phase of a system. Depending thereon, the voltage $V_{SSDET}$ at the sampling instant corresponding to a desired soft switching can be determined either by calculation or experimentally, and can be fixed as a system parameter: in the following, this "optimum" voltage will be referred to as $V_{OPT}$.

The "off" time can be adjusted at each cycle m+1 as a function of the "off" time at a previous cycle m based on the relationship:

$$T_{off}(m+1) = T_{off}(m) + g(V_{SSDET} - V_{OPT})$$

where g denotes a fixed gain parameter selected based on a judicious trade-off of the speed of adaptation and noise sensitivity: a high value facilitates fast convergence of the system towards an optimum point, but otherwise produces time jitter due to sensitivity to noise.

In a steady state, the "off" time will be the one providing a measured voltage $V_{SSDET}$ equal to the optimal point $V_{OPT}$.

A drawback of this approach lies in that the "off" time involved in reaching an optimal point for soft switching is proportional to the peak current at the end of the "on" time.

Any time a change occurs in the converter load current, the control loop reacts by increasing or decreasing the peak current, and the adaptive procedure regulating operation will take some time to reach again the optimal condition: if load changes occur frequently, the converter 10 may remain away from an optimal condition for long, with a detrimental impact on the efficiency.

That drawback can be overcome if the peak current at the end of the "on" phase or the duration of the "on" phase are known, as is the case for most converter control methods.

Figure 10:
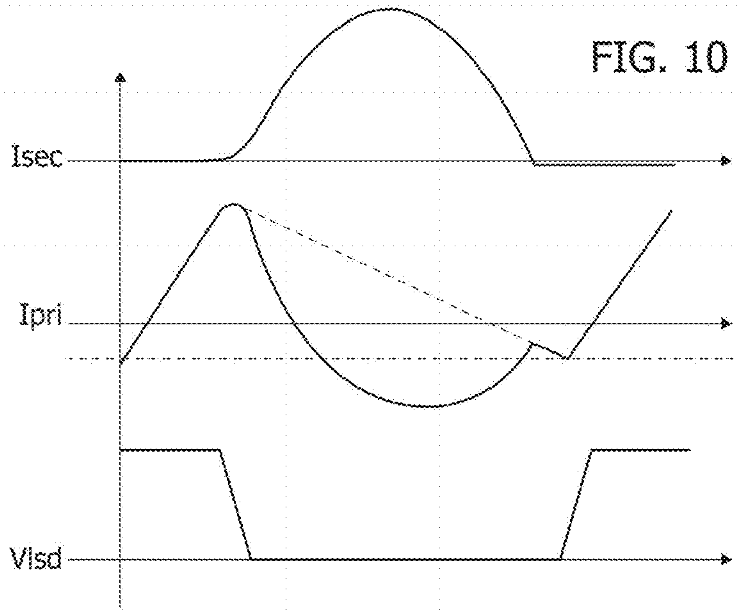

Looking at FIG. 10, and primarily to the time behavior of the current Ipri in the primary winding of the transformer Tx, one can observe that the slope of the magnetizing current $i_m$ during the on time satisfies the following relationship:

$$\partial i_m/\partial t = (VIN - V_{CRES})/(L_m + L_k) \approx (VIN - nVout)/L_m$$

while the slope of the magnetizing current $i_m$ during the off time satisfies the following relationship $$\partial i_m/\partial t = (nVout/L_m).$$

Looking at FIG. 10, one can observe that the time to reach zero current during the "off" phase is approximately given by the ratio:

$I_{peak}(Lm/nVout)$.

In the relationships above:

$I_{peak}$ is the peak value of the current Ipri in the primary winding of the transformer Tx, $L_m$ is the magnetizing inductance of the transformer Tx, $L_k$ is the leakage inductance of the transformer Tx, n is the turns ratio of the transformer Tx, $V_{CRES}$ is the voltage across the capacitor CRES, and VIN and Vout are the input voltage and the output voltage of the circuit 10.

One can take advantage of these relationships to calculate the "off" time as:

$$T_{off} = k_{ipk} I_{pk} + T_{offset}$$

or $$T_{off} = k_t T_{on} + T_{offset}$$

where $k_{ipk}=(L_m/nV_{out})$ and $k_t=(V_{in}-nV_{out})/(nV_{out})$, while the time $T_{offset}$ is adaptively calculated as discussed previously as:

$$T_{offset}(m+1) = T_{offset}(m) + g(V_{SSDET} - V_{OPT})$$

The advantage of this approach lies in that the adaptive procedure only compensates for the differences between the "off" time estimated based on the peak current or "on" time and the one required to reach an optimal soft switching.

Solutions as described herein use a modified control sequence, which can be regarded as a sort of non-complementary mode, based on the duration of the "off" time, as calculated by the procedure described in the foregoing (or a similar procedure).

Such a non-complementary control sequence is summarized in FIGS. 11A, 11B; 12A, 12B; 13A, 13B; and 14A, 14B.

As noted, FIGS. 11A and 11B; FIGS. 12A and 12B; and FIGS. 14A and 14B essentially correspond to FIGS. 2A and 2B; FIGS. 3A and 3B; and FIGS. 4A and 4B, as discussed previously, respectively.

This repetition of figures is essentially intended to facilitate understanding operation of the circuit 10 during the phase represented in FIGS. 13A and 13B.

Figure 6A:
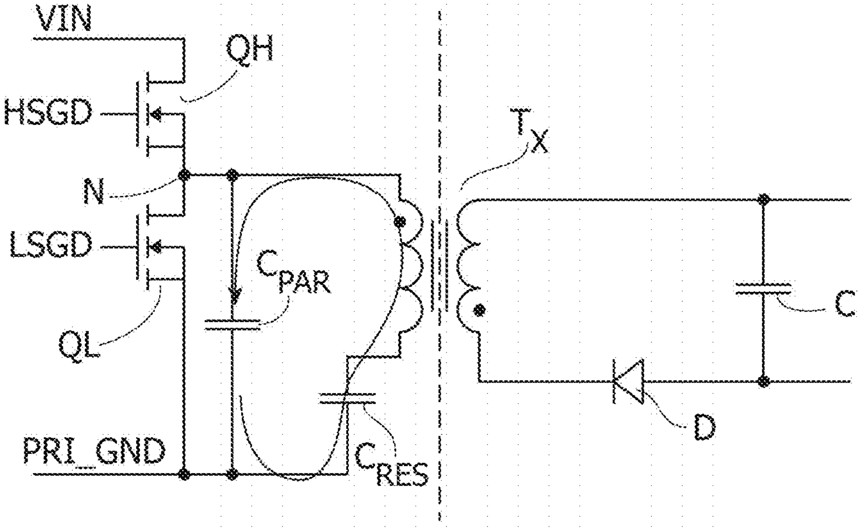
Figure 6B:
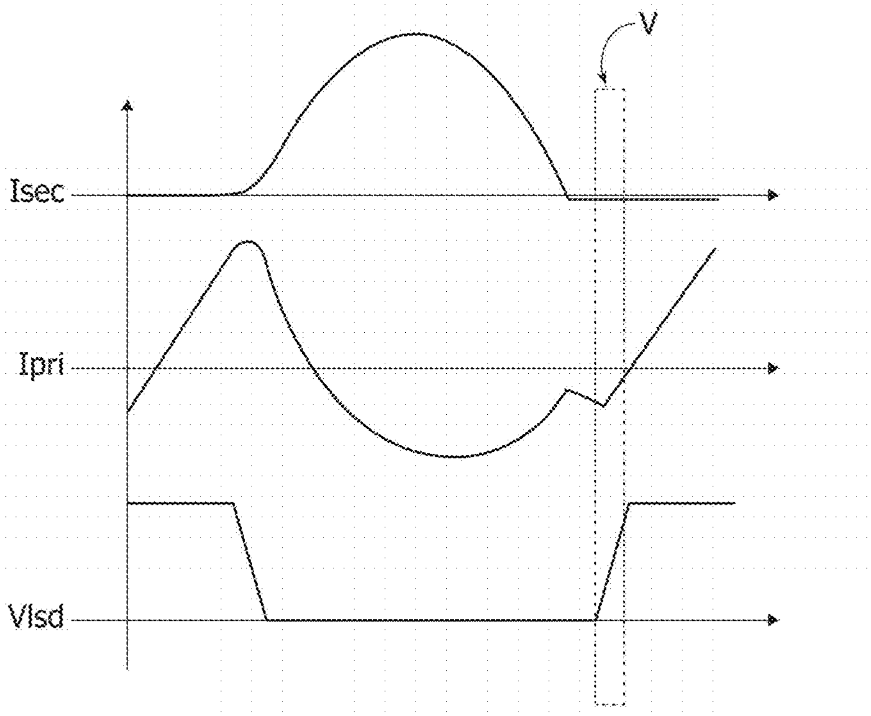
Figure 7A:
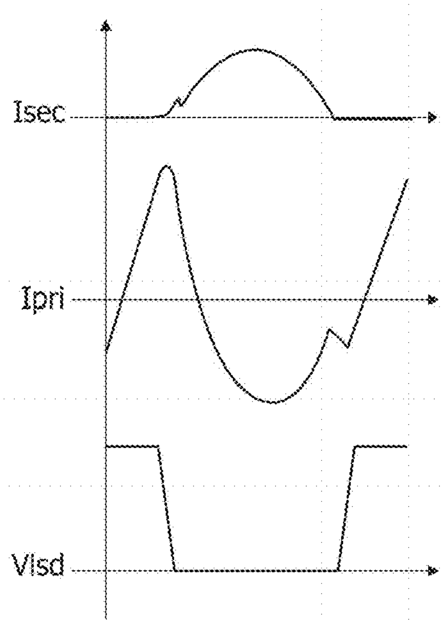
Figure 7B:
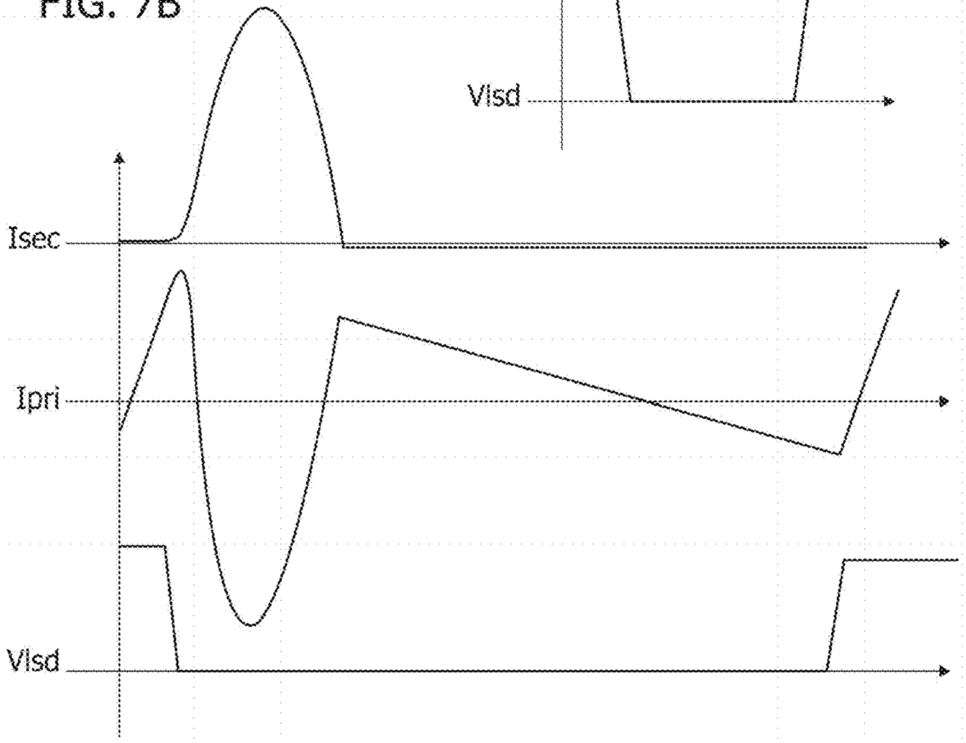

As likewise noted, the dead times referred to as II and V in FIG. 3B and FIG. 6B have a very short duration, practically negligible in comparison with the other phases and will not be considered extensively in the rest of this description.

The non-complementary mode discussed herein relies on a control sequence including an energy storage phase I with current flow and waveforms as depicted in FIGS. 11A and 11B. This phase operates with the high-side switch QH on (conductive) and the low-side switch QL off (non-conductive), exactly as in the conventional control method illustrated in FIGS. 2A and 2B.

A (short) dead time II follows with current flow and waveforms as depicted in FIGS. 12A and 12B, namely with the high-side switch QH and the low-side switch QL both off (non-conductive), exactly as in the conventional control method illustrated in FIGS. 3A and 3B.

A "secondary side conduction only" phase IIA follows as illustrated in FIGS. 13A and 13B.

The addition of this phase IIA marks a difference with respect to the conventional control sequence discussed in the introductory portion of this description.

During the phase illustrated in FIGS. 13A and 13B, both switches QL and QH remain off over a time advantageously (much) longer than a deadtime.

By keeping both switches QH and QL off, the secondary side diode D becomes conductive and current starts flowing (only) on the secondary side only. As in a conventional flyback topology, the current in the secondary side of the transformer Tx decreases linearly.

Figure 4A:
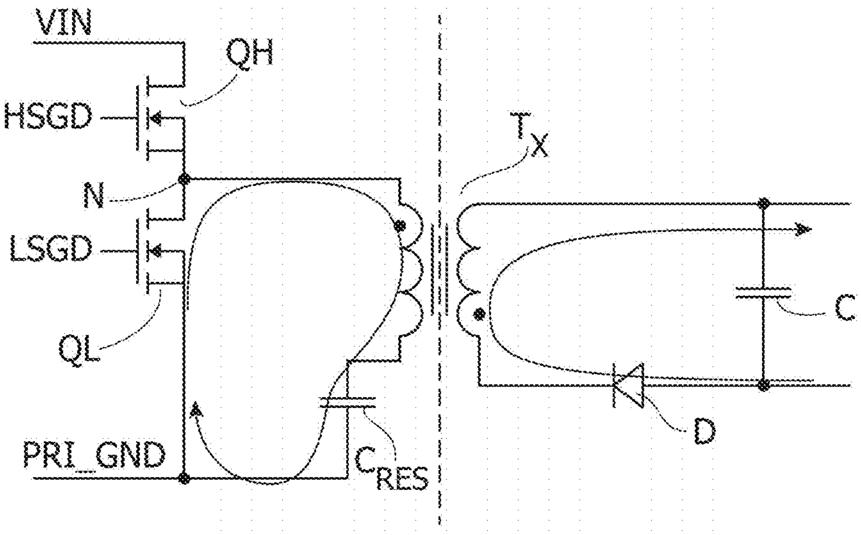
Figure 4B:
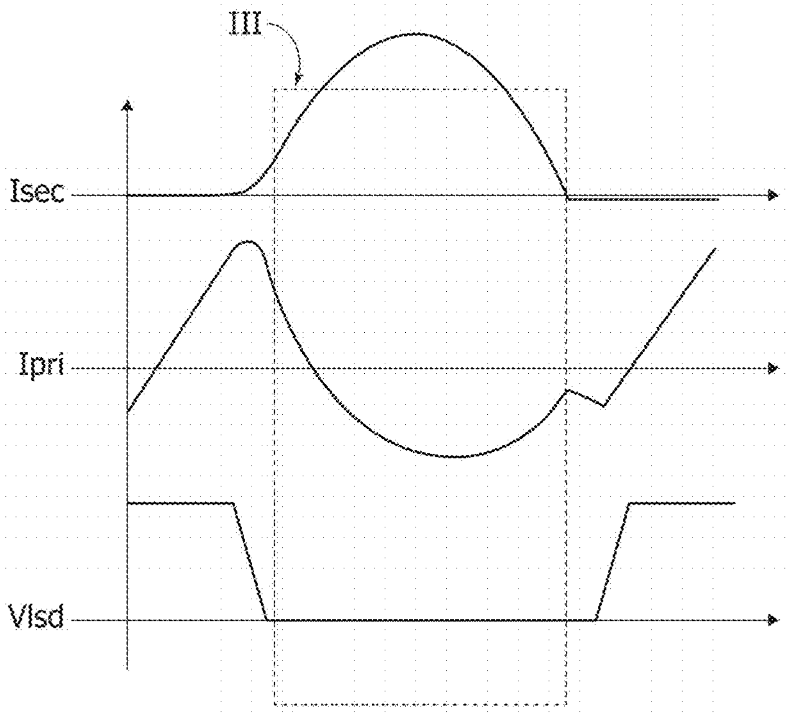
Figure 14A:
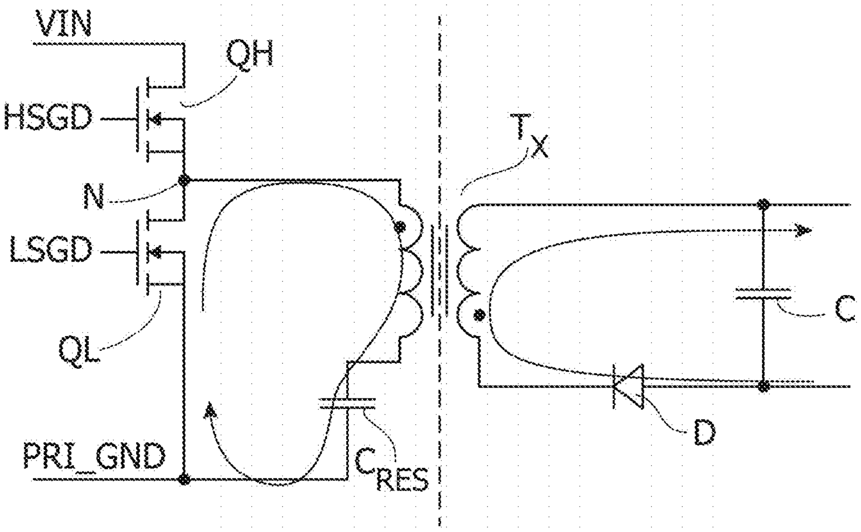
Figure 14B:
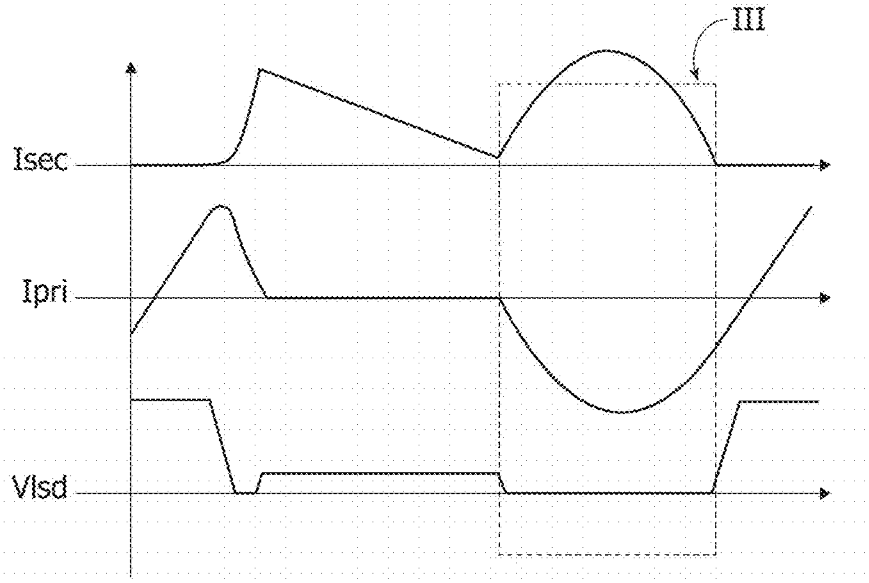

FIGS. 14A and 14B illustrate a subsequent phase (labelled III by way of reference to FIGS. 4A and 4B), where, after a time determined by the controller, the low-side switch QL on the primary side of the transformer is turned on and, during this phase, current flows both on the primary side and the secondary side of the transformer Tx (with a sort of "concurrent conduction") as in the case of a conventional solution as depicted in FIGS. 4A and 4B.

The phase ends as the current in the secondary side reaches zero.

An additional extra "off" time, during which the low-side switch QL is on but no current flows on the secondary side of the transformer may be added at the end of phase III. Just as described for the traditional control sequence, after the low-side switch QL is turned off, a dead time is beneficial in avoid cross conduction and to facilitate the switching node N in reaching an input voltage adequate to obtain soft switching at (subsequent) turning on the high-side switch QH (in a new energy storage phase I).

The duration of secondary side only phase (labelled IIA in FIG. 13B) and the subsequent "concurrent conduction" phase (labelled III in FIG. 14B) can be determined based on the "off" time as calculated either by the method described in the foregoing (or by a different method).

A duration $T_{cond}$ for the phase labelled III in FIG. 14B can be programmed as a fixed parameter based on the values of the leakage inductance $L_k$ and the value of the resonant capacitor CRES.

This can be regarded as approximately equal to:

$$T_{cond} \approx \pi/\sqrt{(L_k C_{RES})}$$

The duration $T_{SSONLY}$ of the secondary side only phase (labelled IIA in FIG. 13B) can be calculated as the difference between the total "off" time $T_{off}$, for example calculated as discusses previously, and the duration $T_{cond}$ of the "concurrent conduction" phase:

$$T_{SSONLY} = T_{off} - T_{cond}$$

A choice can be made between the conventional operation mode (FIGS. 2A, 2B thru FIGS. 6A, 6B) and the non-complementary mode (FIGS. 11A, 11B thru FIGS. 14A, 14B) by noting that this latter control sequence is more efficient when the duration of the "off" time is (much) longer than the duration $T_{cond}$.

Such a choice can be made based on the duration of the "off" time $T_{off}$, switching to the non-complementary mode when $T_{off}>k_1*T_{cond}$ and switching back to normal mode when $T_{off}<k_2*T_{cond}$.

The difference between the values $k_1$ and $k_2$ provides some hysteresis to avoid that the system should continuously switch between the two modes. For example, a judicious choice can be $k_1=3$ and $k_2=2$.

Figure 15:
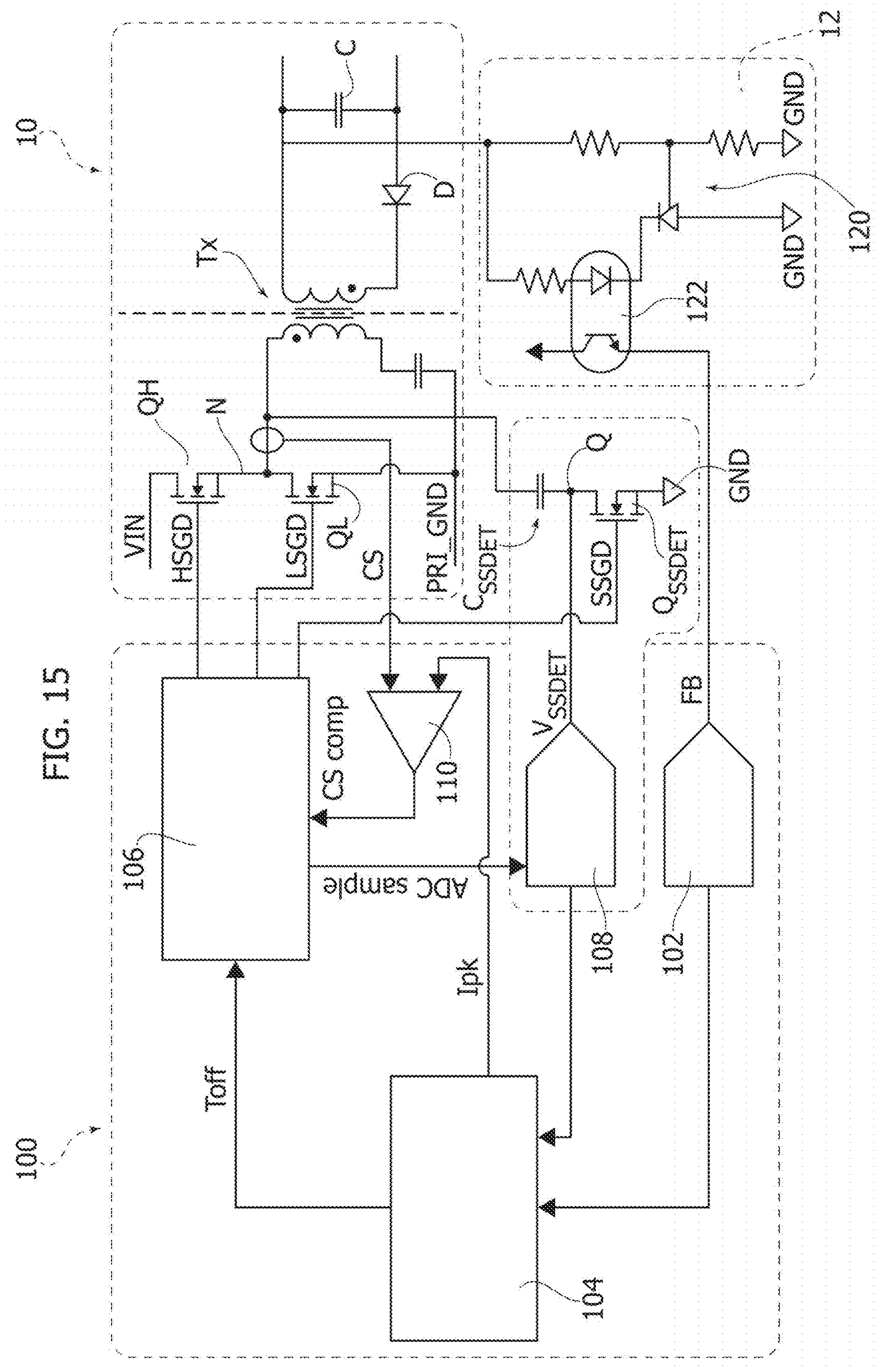
FIG. 15 is a circuit diagram exemplary of a possible digital implementation of solutions described in the present description.

FIG. 15 shows a first possible implementation of a complete system including a circuit 10 as described in the foregoing (see FIG. 8, for instance).

A system as illustrated in FIG. 15 comprises a resonant flyback converter 10, a voltage feedback circuit 12, and a (here digital) controller 100 configured to cooperate with the soft switching detector circuit comprising the capacitor $C_{SSDET}$ and the switch $Q_{SSDET}$ coupled via the node Q therebetween to the switching node N.

Figure 5A:
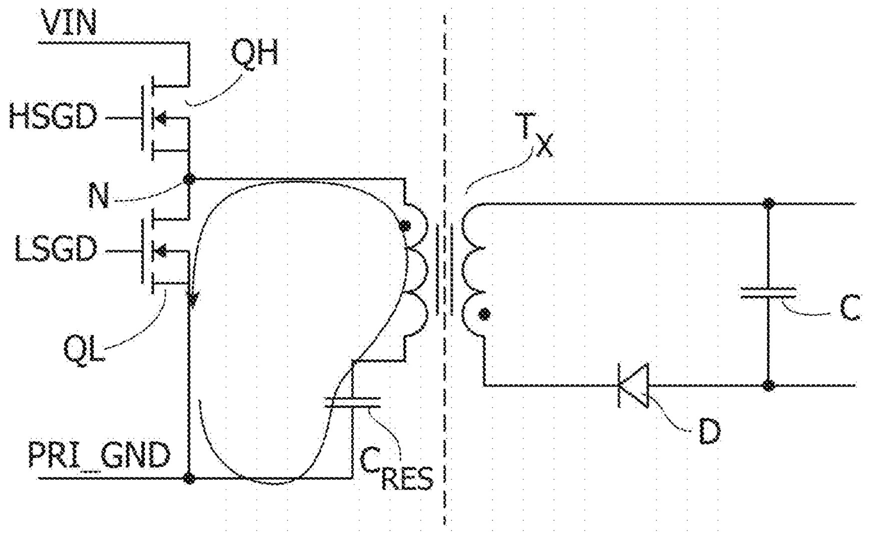
Figure 5B:
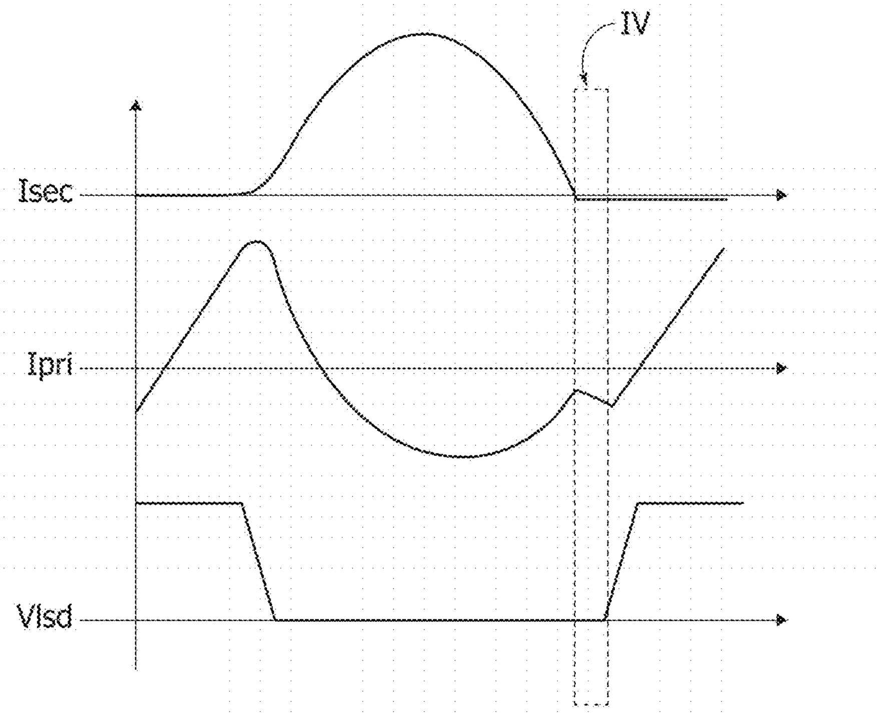

The soft switching detector circuit in question has already been described in connection with FIG. 8 and represented in FIG. 5 as a separate entity from the converter 10 for simplicity an ease of explanation.

The feedback circuit 12 (of any known type to those of skill in the art) is configured to compare the output voltage Vout of the converter 10 (advantageously as a replica thereof obtained via a voltage divider/rectifier arrangement 120) with a reference voltage and to generate (advantageously via an opto-coupler 122) a feedback signal FB representative of a desired peak current for the operation of the converter 10.

The microcontroller 100 reads (via an analog-to-digital converter, ADC 102) the feedback value FB and sets accordingly a peak current $I_{pk}$ value that is applied to a processing unit (MCU) 104 configured to produce the value of the "off" time $T_{off}$.

The value of the "off" time $T_{off}$ is supplied to a PWM generator 106 that drives the high-side switch QH and the low-side switch QL of the converter 10 via the control terminals (gates, in the case of field-effect transistors such as MOSFET transistors) thereof, namely HSGD and LSGD.

Figure 16:
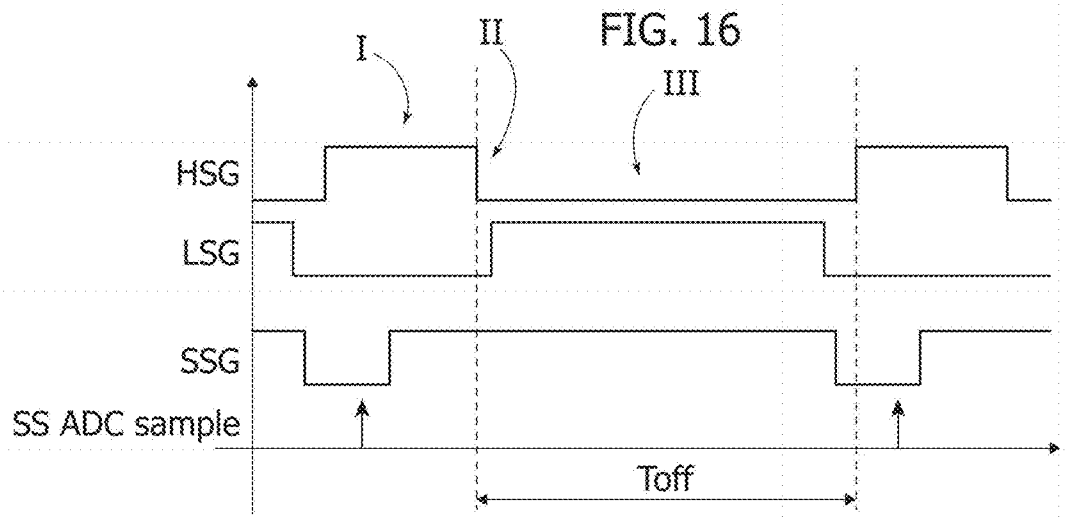
FIGS. 16 and 17 are time diagrams explicative of possible operation of solutions described in the present description.

When in a normal mode, the PWM generator 106 generates the waveforms HSG (high-side) and LSG (low-side) shown in the two upper curves in FIG. 16 that are applied to the control terminals HSGD and LSGD, respectively.

The lower curve in FIG. 16 (where all the curves share a common abscissa time scale) represent a possible corresponding time behavior of a signal SSG at the control terminal (gate, in the case of field-effect transistor such as a MOSFET transistor) of the switch SSGD as sampled (via an analog-to-digital converter, ADC 108) at sampling times SS ADC sample under the control of a signal ADC sample from the PWM generator 106.

The switching cycle can be regarded as starting with the "QL-to-QH" dead time. During that period, after a time programmed by the MCU, the switch $Q_{SSDET}$ is turned off (made non-conductive). At the end of the dead time the high-side switch QH is turned on (made conductive), and remains on until a comparator 110 is triggered in response to a signal CS comp being asserted in response to a (voltage) signal CS at the switching node N being found to exceed the peak value $I_{pk}$ as provided by the microcontroller unit 104.

During the "on" time of the high-side switch QH, the voltage SSDET at the node D is sampled (see the signal SS ADC sample in FIG. 16) to determine the onset of a soft switching condition.

In response to the high-side QH switch being turned off, the PWM generator 106 waits for a second dead time (again, this may be a fixed value programmed by the MCU 104), and remains off (non-conductive) for a time equal to $T_{off}$–$T_{dLH}$, where $T_{dLH}$ is the "QL-to-QH" dead time.

Figure 17:
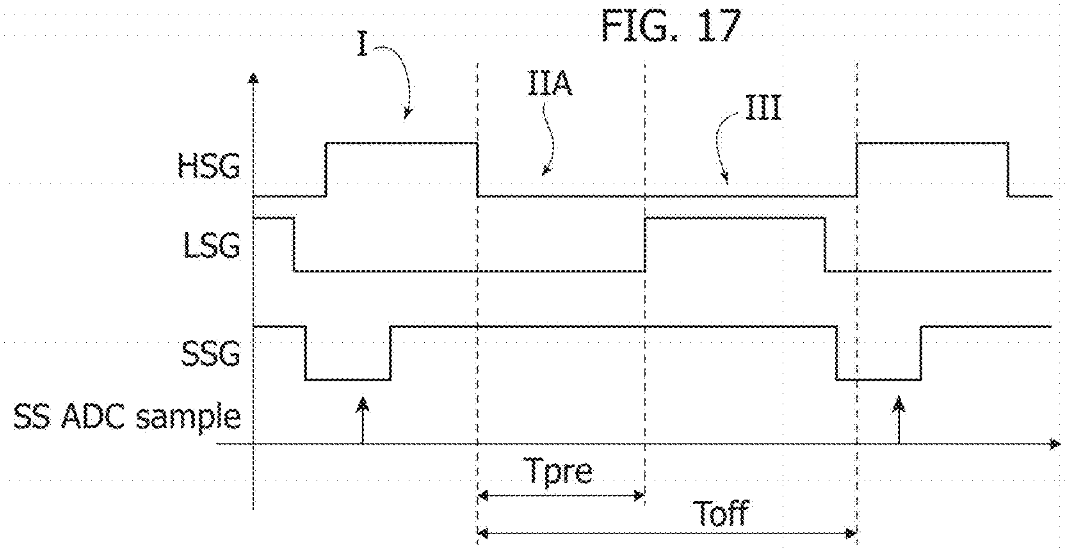

In order to implement the non-complementary mode, the MCU 104 is programmed to provide a long dead time between the time the high-side switch QH is turned off and the time the low-side switch QL is turned on, such a long dead time being equal to $T_{pre}$, as represented in FIG. 17.

Here again, like in FIG. 16, all the curves share a common abscissa time scale and the two upper curves show a possible time behavior of the waveforms HSG (high-side) and LSG (low-side) applied by the PWM generator 106 to the control terminals HSGD and LSGD (gates, in the case of field-effect transistor such as a MOSFET transistor) of the high-side switch QH and the low-side switch QL, respectively.

The lower curve in FIG. 17 again represents a possible corresponding time behavior of a signal SSG at the control terminal (gate, in the case of field-effect transistor such as a MOSFET transistor) of the switch SSGD as sampled (via the ADC 108) at sampling times SS ADC sampled under the control of the signal ADC sample from the PWM generator 106.

To summarize, in solutions as described herein:

in the first ("normal") operation mode, the dead time II has first (shorter) dead time duration with the phase III maintained over the (first) off time $T_{off}$, and in the second ("non-complementary") operation mode, the dead time (labelled IIA) has a second dead time duration ($T_{pre}$ in FIG. 17) extended beyond the first dead time duration by the secondary side conduction time during which current starts flowing in the secondary winding of the transformer Tx, with the (second) off time (namely $T_{off}$–$T_{pre}$) of the first switch (the transistor QH) shortened with respect to the first off time $T_{off}$ of the first switch QH by the second dead time duration $T_{pre}$.

Figure 18:
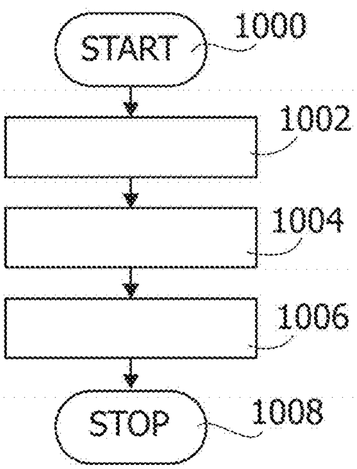
FIGS. 18 and 19 are flow-charts exemplary of possible operation of solutions described in the present description.

Every time the voltage SSDET is sampled, the procedure shown in the flow-chart of FIG. 18 is run, updating the "off" time that optimizes soft switching.

The blocks in FIG. 18 have the following meaning:

1000: START (with SS ADC sample available)

1002: Read SS ADC value as $V_{SSDET}$

1004: Adjust $T_{offset}$ as $$T_{offset}(m+1) = T_{offset}(m) + g(V_{SSDET} - V_{OPT})$$

1006: calculate $T_{off}$ as $$T_{off} = k_{ipk} I_{pk} + T_{offset}$$

1008: STOP

Figure 19:
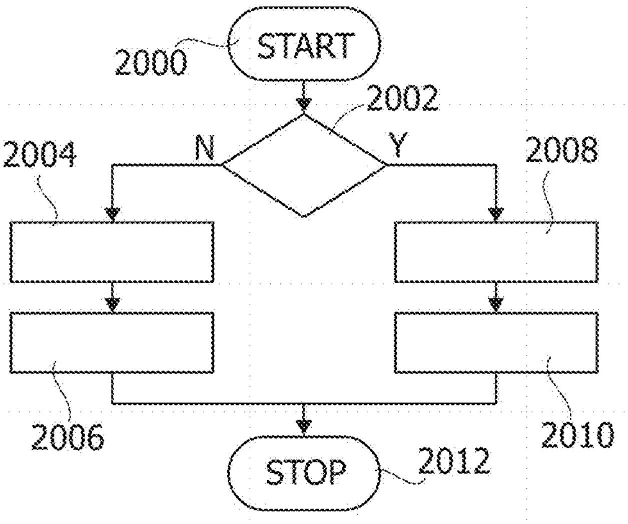

After the procedure in FIG. 18 is run, the procedure shown in the flow-chart of FIG. 19 is launched to choose between normal and noncomplementary mode.

The blocks in FIG. 19 have the following meaning:

2000: START

2002: check if $T_{off}$ is higher than $k*T_{res2}$: this is a (possibly adjustable) fixed reference that can be used determine if the converter should operate in normal or noncomplementary mode.

2004: if lower (outcome of step 2002=N), normal mode ($T_{pre}$=$T_{dHL}$) is selected/maintained and in step 2006 set k=$k_1$ (for hysteresis in comparison);

2008: if higher (outcome of step 2002=Y), non-complementary mode ($T_{pre}$=$T_{off}$–$T_{res2}$) is selected and in step 2010 set k=$k_2$ (for hysteresis in comparison);

2012: STOP.

Figure 20:
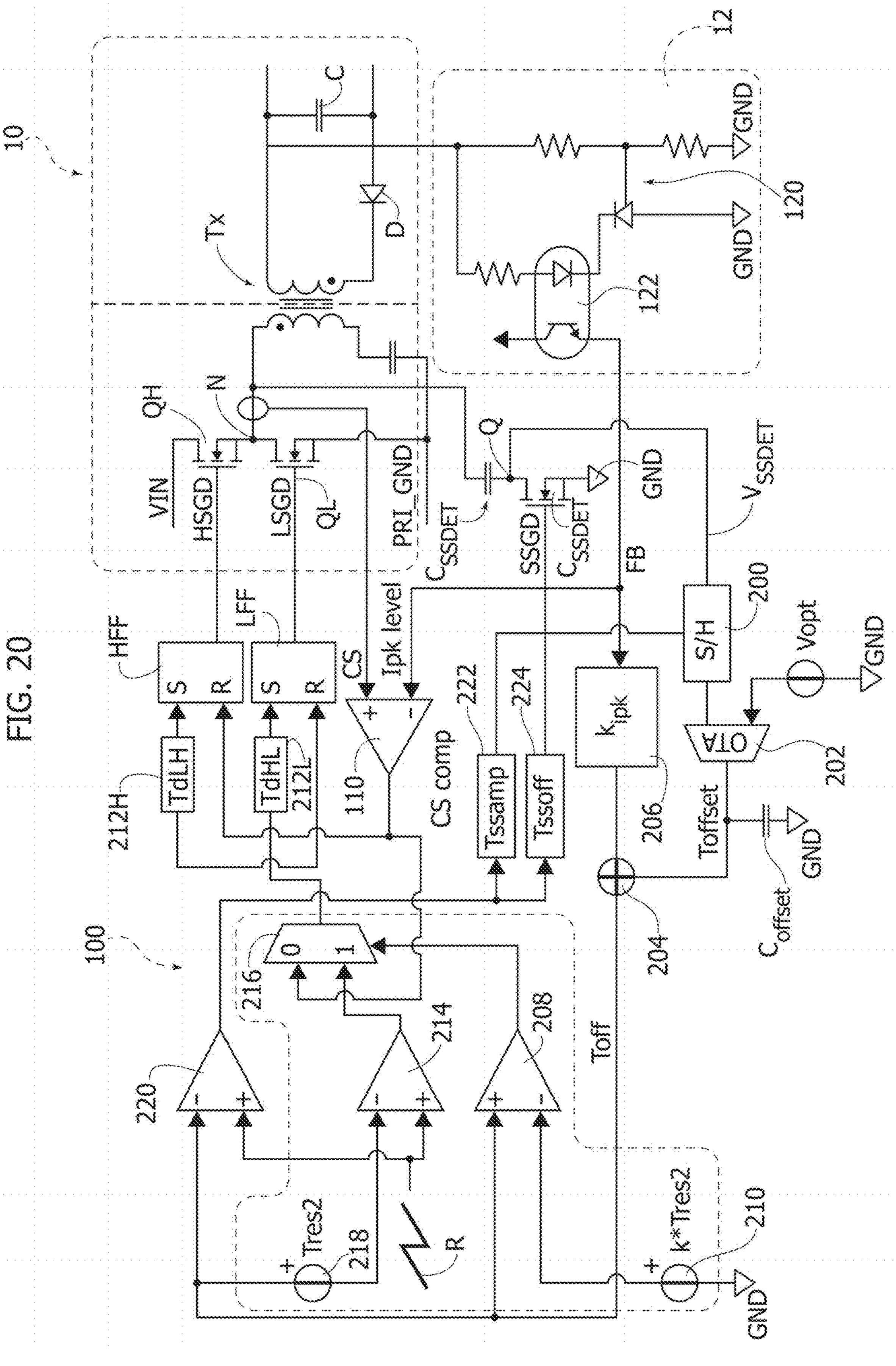
FIG. 20 is a circuit diagram exemplary of a possible analog implementation of solutions described in the present description.

The way of operation described in the foregoing can be implemented also in analog form as shown in FIG. 20.

Parts or elements like parts or elements already visible in FIG. 15 (the resonant flyback converter 10, the soft switching detector circuit associated therewith, the voltage feedback circuit 12, and the comparator 110 for instance) are indicated in FIG. 20 with like reference symbols and a detail description will not be repeated for brevity.

In the case of the analog implementation of FIG. 20 the calculation of the offset time $T_{offset}$ can be done by using a sample and hold circuit (S/H) 200 configured to sample the voltage SSDET at the node Q.

The sampled value is applied to an operational transconductance amplifier (OTA) 202. This is an amplifier which outputs a current proportional to the difference between the voltages at its input terminals, namely sample the voltage SSDET sampled at the node Q and a fixed reference Vopt. The OTA 202 charges or discharges a capacitor $C_{offset}$ with a current proportional to the error between the sampled voltage SSDET and the target voltage, integrated over time. The voltage on the capacitor can be summed at a summing node 204 with a voltage proportional (via a factor $k_{ipk}$ provided by a gain stage 206) to the feedback signal FB to obtain the "off" time $T_{off}$ at the output of the node 204.

The "off" time $T_{off}$ at the output of the node 204 is compared in a comparator 208 with the fixed reference $k*T_{res2}$ (generated in a manner known per se to those of skill in the art in a reference source 210) to determine if the converter 10 should operate in the normal mode or in the non-complementary mode.

As illustrated in FIG. 20, the high-side switch QH and the low-side switch QL are driven (via their control terminals HSGD and LSGD) via respective flip-flops HFF and LFF.

The high side switch QH is turned off then the current sense comparator 110 (coupled to the reset input of the flip-flop HFF) is triggered, implementing a peak current mode control scheme.

In a normal mode, the low side switch QL is turned on (via its set input) after a high-to-low dead time $T_{dHL}$ set in a block 212L while in non-complementary mode a delay $T_{pre}$ determined by a comparator 214 is added via a first input of a multiplexer 216.

The delay $T_{pre}$ is determined by the comparator 214 by comparing:

a ramp signal R that has a predetermined slope and is reset every time the high-side switch QH is turned off (the ramp signal R is generated in a manner known per se to those of skill in the art via a ramp generator not visible for simplicity), and the "off" time signal $T_{off}$ (coming from the summing node 204) minus a fixed voltage $T_{res2}$ generated in a manner known per se to those of skill in the art in a reference source 218 (this may at least partly correspond to the source 210).

The "on" phase of the low-side switch QL terminates when a further comparator 220 (coupled to the reset input of the flip-flop LFF) is triggered.

The comparator 220 is configured to compare the voltage $T_{off}$ with the ramp signal R and is also coupled to:

the set input of the flip-flop HFF via a block 212H providing a low-to-high dead time $T_{dLH}$ for turning on the high-side switch QH;

the sample-and-hold circuit 200, to control sampling of the signal SSDET at the node Q, via a timing block 222; and the control terminal SSGD of the switch $Q_{SSDET}$, via a timing block 224.

The role of the MUX 216 can be explained as follows.

Considering the normal mode, namely when the calculated $T_{off}$ is less than $k^*Tres_2$, and assuming to start from the QH "on" condition, namely the one to which the waveform in FIG. 2 refers:

when the current detected by the current sensing signal CS exceeds a threshold Ipk level, the comparator 110 trips and the output signal from the comparator 110 activates the reset input R of the flip-flop HFF, causing the switch QH to turn off, thus entering the phase shown in FIG. 3; and the same signal passes through the MUX 216 and reaches the delay 212L; after a delay TdHL (set in the block 212L) the set input of the flip-flop LFF is activated, and then the device moves on to the phase in FIG. 4.

Considering the non-complementary mode, namely when the calculated Toff is higher than $k^*Tres_2$ and assuming to start from the QH "on" condition, namely the one to which the waveform in FIG. 11 refers:

when the current detected by the current sensing signal CS exceeds the threshold Ipk level, the comparator 110 trips and the output signal from the comparator 110 activates the reset input of the flip-flop HFF, causing the switch QH to turn off, thus entering the phase shown in FIG. 12;

tripping of the comparator 110 resets the ramp R and the low-side switch QL remains off even during the phase shown in FIG. 13: the transition from FIG. 12 to FIG. 13 does not take place due to the device but simply because the current in the primary side reaches zero;

after a time determined by the input level—on the comparator 214—the comparator trips and via the MUX 216 the signal therefrom reaches the set input S of the flip-flop LFF (advantageously, a—very small—delay TdHL is added).

To summarize:

in the one case, the MUX 216 "passes" the signal to turn on the switch QL shortly after the switch QH turns off, and in the other case, the MUX 216 turns it off after a delay that is function (proportional) to the input at the comparator 214.

In both instances (FIG. 15 and FIG. 20), the circuit 10 comprises control circuitry 100 configured to operate the drive circuitry 106 in FIG. 12 or HFF, LFF, 212H, 212L in FIG. 20:

in a first, "normal" operation mode, wherein the phase III is maintained over the (first) off time $T_{off}$ (of the first switch/transistor QH), and in a second, "non-complementary" operation mode, wherein the phase III is maintained over a (second) off time $T_{off}-T_{pre}$ (of the first switch/transistor QH) that has a shorter duration than the first off time $T_{off}$.

Selection between the two operating modes ("normal" or "non-complementary") involves comparing the first off time $T_{off}$ with at least one reference threshold such as $k^*T_{res2}$; $k_1^*T_{cond}$; $k_2^*T_{cond}$.

The first operation mode ("normal") can thus be selected in response to the first off time $T_{off}$ failing to reach the reference threshold $k^*T_{res2}$ or $k_2^*T_{cond}$.

The second operation mode ("non-complementary") can be selected in response to the first off time $T_{off}$ reaching the at least one reference threshold ($k^*T_{res2}$ or $k_1^*T_{cond}$).

Advantageously, a hysteresis mechanism can be provided with the first off time $T_{off}$ compared with a first reference threshold $k_2^*T_{cond}$ and with a second reference threshold $k_1^*T_{cond}$, the second reference threshold $k_1^*T_{cond}$ being higher than the first reference threshold $k_2^*T_{cond}$.

In that case:

the first operation mode ("normal") is selected in response to the first off time $T_{off}$ failing to reach the (lower) first reference threshold $k_2^*T_{cond}$, and the second operation mode ("non-complementary") is response to the first off time $T_{off}$ reaching the (higher) second reference threshold $k_1^*T_{cond}$.

Without prejudice to the underlying principles, the details and embodiments may vary, even significantly, with respect to what has been described by way of example only, without departing from the extent of protection.

The extent of protection is determined by the annexed claims.

What is claimed is:

1. A circuit, comprising:

a first electronic switch and a second electronic switch having current flow paths therethrough cascaded in a current flow line between an input node of the circuit and a ground;

a transformer having a primary winding coupled across the second electronic switch;

a capacitor coupled across a secondary winding of the transformer wherein an output voltage from the circuit is available across the capacitor;

drive circuitry configured to make the first electronic switch and the second electronic switch conductive and non-conductive in a sequence of phases comprising an energy storage phase, wherein the first electronic switch is conductive and the second electronic switch is non-conductive with current flow facilitated in the primary winding of the transformer and countered in the secondary winding of the transformer, and subsequently a concurrent conduction phase wherein the first electronic switch is non-conductive and the second electronic switch is conductive with current flow facilitated in both the primary winding of the transformer and in the secondary winding of the transformer; and control circuitry configured to:

compare a first off time of the first electronic switch with at least one reference threshold;

in response to the first off time of the first electronic switch failing to reach the at least one reference threshold, operate the drive circuitry in a first operation mode in which the concurrent conduction phase is maintained over the first off time of the first electronic switch; and in response to the first off time of the first electronic switch reaching the at least one reference threshold, operate the drive circuitry in a second operation mode in which the concurrent conduction phase is maintained over a second off time of the first electronic switch, wherein the second off time has a shorter duration than the first off time.

2. The circuit of claim 1, wherein the control circuitry is configured to compare the first off time with a first reference threshold and a second reference threshold, the second reference threshold being higher than the first reference threshold, and to operate the drive circuitry:

in the first operation mode in response to the first off time failing to reach the first reference threshold; and in the second operation mode in response to the first off time reaching the second reference threshold.

3. The circuit of claim 1, further comprising a series connection of the capacitor and a diode coupled across the secondary winding of the transformer.

4. The circuit of claim 1, wherein:

the drive circuitry is configured to make the first electronic switch and the second electronic switch both non-conductive during a dead time between the energy storage phase and the concurrent conduction phase in the sequence of phases; and the control circuitry is configured to operate the drive circuitry:

in the first operation mode, with the dead time having a first dead time duration and with the concurrent conduction phase maintained over the first off time of the first electronic switch; and in the second operation mode, with the dead time having a second dead time duration extended beyond the first dead time duration by a secondary side conduction time during which current starts flowing in the secondary winding of the transformer, with the second off time of the first electronic switch shortened with respect to the first off time of the first electronic switch by the second dead time duration.

5. The circuit of claim 1, further comprising:

a primary sensing node on the current flow line between the input node of the circuit and the ground, the primary sensing node arranged between the first electronic switch and the second electronic switch; and a soft switching detector comprising a soft switching detection node capacitively coupled to the primary sensing node and configured to be set to the ground in response to a further switch being conductive;

wherein the control circuitry is configured to:

detect a soft switching detection signal at the soft switching detection node in response to the further switch being made non-conductive following the first electronic switch being made conductive; and adjust the first off time of the first electronic switch iteratively with an adjustment factor based on a difference between the soft switching detection signal and a soft switching reference value.

6. The circuit of claim 1, wherein the drive circuitry comprises a pulse-width modulation (PWM) generator configured to:

start the concurrent conduction phase by making the first electronic switch non-conductive and the second electronic switch conductive at respective edges of a pulse width modulated signal produced by the PWM generator; and produce the respective edges of the pulse width modulated signal in the second operation mode with a delay to the respective edges of the pulse width modulated signal as produced in the first operation mode.

7. The circuit of claim 1, wherein the drive circuitry comprises flip-flop circuitry configured to:

start the concurrent conduction phase by making the first electronic switch non-conductive and the second electronic switch conductive in response to a reset signal and to a set signal applied to the first electronic switch and to the second electronic switch, respectively; and produce the reset and set signals in the second operation mode with a delay to the reset and set signals as produced in the first operation mode.

8. A method of operating a circuit comprising first and second electronic switches having current flow paths therethrough cascaded in a current flow line between an input node of the circuit and a ground, a transformer having a primary winding coupled across the second electronic switch, and a capacitor coupled across a secondary winding of the transformer, the method comprising:

making, by drive circuitry, the first electronic switch and the second electronic switch conductive and non-conductive in a sequence of phases comprising an energy storage phase with the first electronic switch being conductive and the second electronic switch being non-conductive with current flow facilitated in the primary winding of the transformer and countered in the secondary winding of the transformer, and subsequently a concurrent conduction phase with the first electronic switch being non-conductive and the second electronic switch being conductive with current flow facilitated in both the primary winding of the transformer and the secondary winding of the transformer;

configuring for operation in a first operation mode with the concurrent conduction phase being maintained over a first off time of the first electronic switch, and in a second operation mode with the concurrent conduction phase being maintained over a second off time of the first electronic switch, the second off time being of shorter duration than the first off time; and comparing, by control circuitry, the first off time with at least one reference threshold, and operating the drive circuitry:

in the first operation mode in response to the first off time failing to reach the at least one reference threshold; or in the second operation mode in response to the first off time reaching the at least one reference threshold.

9. The method of claim 8, further comprising:

comparing the first off time with a first reference threshold and a second reference threshold, the second reference threshold being higher than the first reference threshold, and operating the circuit:

in the first operation mode in response to the first off time failing to reach the first reference threshold, or in the second operation mode in response to the first off time reaching the second reference threshold.

10. The method of claim 8, further comprising:

making the first electronic switch and the second electronic switch both non-conductive during a dead time between the energy storage phase and the concurrent conduction phase in the sequence of phases; and operating the circuit:

in the first operation mode, with the dead time having a first dead time duration and with the concurrent conduction phase maintained over the first off time; and in the second operation mode, with the dead time having a second dead time duration extended beyond the first dead time duration by a secondary side conduction time during which current starts flowing in the secondary winding of the transformer, with the second off time shortened with respect to the first off time by the second dead time duration.

11. The method of claim 8, wherein the circuit comprises a primary sensing node on the current flow line between the input node of the circuit and the ground, the primary sensing node arranged between the first electronic switch and the second electronic switch, and the method further comprises:

detecting a soft switching detection signal at a soft switching detection node capacitively coupled to the primary sensing node in response to the soft switching detection node being decoupled from the ground following the first electronic switch being made conductive; and adjusting the first off time of the first electronic switch iteratively with an adjustment factor based on a difference between the soft switching detection signal and a soft switching reference value.

12. The method of claim 8, wherein the circuit comprises a series connection of the capacitor and a diode coupled across the secondary winding of the transformer, and the method further comprises providing an output voltage across the capacitor.

13. The method of claim 8, further comprising:

starting, by a pulse-width modulation (PWM) generator of the drive circuitry, the concurrent conduction phase by making the first electronic switch non-conductive and the second electronic switch conductive at respective edges of a pulse width modulated signal produced by the PWM generator; and producing, by the PWM generator, the respective edges of the pulse width modulated signal in the second operation mode with a delay to the respective edges of the pulse width modulated signal as produced in the first operation mode.

14. The method of claim 8, further comprising:

starting, by flip-flop circuitry of the drive circuitry, the concurrent conduction phase by making the first electronic switch non-conductive and the second electronic switch conductive in response to a reset signal and to a set signal applied to the first electronic switch and to the second electronic switch, respectively; and producing the reset and set signals in the second operation mode with a delay to the reset and set signals as produced in the first operation mode.

15. A method of operating a circuit comprising first and second electronic switches having current flow paths therethrough cascaded in a current flow line between an input node of the circuit and a ground, a transformer having a primary winding coupled across the second electronic switch, and a capacitor coupled across a secondary winding of the transformer, the method comprising:

making, by drive circuitry, the first electronic switch and the second electronic switch conductive and non-conductive in a sequence of phases comprising an energy storage phase with the first electronic switch being conductive and the second electronic switch being non-conductive with current flow facilitated in the primary winding of the transformer and countered in the secondary winding of the transformer, and subsequently a concurrent conduction phase with the first electronic switch being non-conductive and the second electronic switch being conductive with current flow facilitated in both the primary winding of the transformer and the secondary winding of the transformer;

comparing, by control circuitry, a first off time of the first electronic switch with at least one reference threshold;

in response to the first off time of the first electronic switch failing to reach the at least one reference threshold, operating, by the control circuitry, the drive circuitry in a first operation mode in which the concurrent conduction phase is maintained over the first off time of the first electronic switch;

comparing, by the control circuitry, a third off time of the first electronic switch with the at least one reference threshold; and in response to the third off time of the first electronic switch reaching the at least one reference threshold, operating, by the control circuitry, the drive circuitry in a second operation mode in which the concurrent conduction phase is maintained over a second off time of the first electronic switch, the second off time being of shorter duration than the first off time.

16. The method of claim 15, further comprising:

comparing the first off time with a first reference threshold and a second reference threshold, the second reference threshold being higher than the first reference threshold;

operating the circuit in the first operation mode in response to the first off time failing to reach the first reference threshold;

comparing the third off time with the first reference threshold and the second reference threshold; and operating the circuit in the second operation mode in response to the third off time reaching the second reference threshold.

17. The method of claim 15, further comprising:

making the first electronic switch and the second electronic switch both non-conductive during a dead time between the energy storage phase and the concurrent conduction phase in the sequence of phases;

operating the circuit in the first operation mode, with the dead time having a first dead time duration and with the concurrent conduction phase maintained over the first off time; and operating the circuit in the second operation mode, with the dead time having a second dead time duration extended beyond the first dead time duration by a secondary side conduction time during which current starts flowing in the secondary winding of the transformer, with the second off time shortened with respect to the first off time by the second dead time duration.

18. The method of claim 15, wherein the circuit comprises a primary sensing node on the current flow line between the input node of the circuit and the ground, the primary sensing node arranged between the first electronic switch and the second electronic switch, and the method further comprises:

detecting a soft switching detection signal at a soft switching detection node capacitively coupled to the primary sensing node in response to the soft switching detection node being decoupled from the ground following the first electronic switch being made conductive; and adjusting the first off time of the first electronic switch iteratively with an adjustment factor based on a difference between the soft switching detection signal and a soft switching reference value.

19. The method of claim 15, further comprising:

starting, by a pulse-width modulation (PWM) generator of the drive circuitry, the concurrent conduction phase by making the first electronic switch non-conductive and the second electronic switch conductive at respective edges of a pulse width modulated signal produced by the PWM generator; and producing, by the PWM generator, the respective edges of the pulse width modulated signal in the second operation mode with a delay to the respective edges of the pulse width modulated signal as produced in the first operation mode.

20. The method of claim 15, further comprising:

starting, by flip-flop circuitry of the drive circuitry, the concurrent conduction phase by making the first electronic switch non-conductive and the second electronic switch conductive in response to a reset signal and to a set signal applied to the first electronic switch and to the second electronic switch, respectively; and producing the reset and set signals in the second operation mode with a delay to the reset and set signals as produced in the first operation mode.

* * * * *